United States Patent
Potter et al.

(10) Patent No.: US 11,686,446 B2
(45) Date of Patent: Jun. 27, 2023

(54) THIN ASPECT LIGHTING SYSTEM WITH CUTOFF

(71) Applicant: Valeo North America, Inc., Troy, MI (US)

(72) Inventors: Brant Potter, Seymour, IN (US); John Orisich, Seymour, IN (US); Matthew Berry, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 17/837,304

(22) Filed: Jun. 10, 2022

(65) Prior Publication Data

US 2022/0341556 A1    Oct. 27, 2022

Related U.S. Application Data

(63) Continuation of application No. 17/361,578, filed on Jun. 29, 2021, now Pat. No. 11,384,912, which is a
(Continued)

(51) Int. Cl.
*F21S 41/147* (2018.01)
*F21S 41/32* (2018.01)
(Continued)

(52) U.S. Cl.
CPC .............. *F21S 41/147* (2018.01); *B60Q 1/04* (2013.01); *F21S 41/141* (2018.01);
(Continued)

(58) Field of Classification Search
CPC ........ F21S 41/148; F21S 41/36; F21S 41/323; F21S 41/365; F21V 7/04; F21V 7/06–09
See application file for complete search history.

(56) References Cited

U.S. PATENT DOCUMENTS

| 4,918,580 A | 4/1990 | Nino |
| 5,636,917 A | 6/1997 | Furami |
| (Continued) | | |

FOREIGN PATENT DOCUMENTS

| AT | 512711 A1 | 10/2013 |
| CN | 101570155 A | 11/2009 |
| (Continued) | | |

OTHER PUBLICATIONS

English Machine Translation of JP 2002170409 A (Year: 2002).*
(Continued)

*Primary Examiner* — Keith G. Delahoussaye
(74) *Attorney, Agent, or Firm* — Valeo North America, Inc.

(57) ABSTRACT

A thin aspect lighting system and method are shown. The system and method include at least one module having a reflector that is generally elliptical in one cross-section and generally parabolic in another cross-section. Each module is adapted to generate at least one of a flat beam pattern, a high beam pattern or a low beam pattern, such as a low beam pattern with a kink or elbow. Also shown is a headlamp assembly having a plurality of modules that generate the same or a different light beam pattern. Manipulation and variation of facets or positions of various components, such as at least one light source provides improved characteristics in one or more of the light beam patterns.

20 Claims, 34 Drawing Sheets

Related U.S. Application Data continuation of application No. 16/849,065, filed on Apr. 15, 2020, now Pat. No. 11,221,119, which is a continuation of application No. 15/316,738, filed as application No. PCT/US2015/034439 on Jun. 5, 2015, now Pat. No. 10,697,607.

(60) Provisional application No. 62/009,324, filed on Jun. 8, 2014.

(51) Int. Cl.

| | | |
|---|---|---|
| *F21S 41/33* | (2018.01) | |
| *F21S 41/26* | (2018.01) | |
| *F21S 41/148* | (2018.01) | |
| *F21S 41/153* | (2018.01) | |
| *F21S 41/141* | (2018.01) | |
| *F21V 13/04* | (2006.01) | |
| *F21S 41/36* | (2018.01) | |
| *F21S 41/657* | (2018.01) | |
| *B60Q 1/04* | (2006.01) | |
| *F21Y 115/10* | (2016.01) | |

(52) U.S. Cl.
CPC .......... *F21S 41/148* (2018.01); *F21S 41/153* (2018.01); *F21S 41/26* (2018.01); *F21S 41/323* (2018.01); *F21S 41/336* (2018.01); *F21S 41/337* (2018.01); *F21S 41/36* (2018.01); *F21S 41/657* (2018.01); *F21V 13/04* (2013.01); *F21Y 2115/10* (2016.08)

(56) References Cited

U.S. PATENT DOCUMENTS

| | | | |
|---|---|---|---|
| 6,224,245 B1 | 5/2001 | Boebel | |
| 6,561,687 B1 | 5/2003 | Satsukawa | |
| 6,811,289 B2 | 11/2004 | Nakata | |
| 7,121,705 B2 | 10/2006 | Tsukamoto | |
| 7,168,836 B2 | 1/2007 | Tatsukawa | |
| 7,311,430 B2 | 12/2007 | Leleve | |
| 7,390,112 B2 | 6/2008 | Albou et al. | |
| 7,524,095 B2 | 4/2009 | Kim | |
| 7,690,826 B2 | 4/2010 | Albou | |
| 7,980,742 B2 | 7/2011 | Albou | |
| 8,287,165 B2 | 10/2012 | Iwasaki | |
| 9,146,013 B2 | 9/2015 | Bauer et al. | |
| 2006/0120094 A1 | 6/2006 | Tsukamoto | |
| 2009/0027911 A1 | 1/2009 | Misawa et al. | |
| 2010/0177525 A1 | 7/2010 | Iwasaki | |
| 2011/0085343 A1 | 4/2011 | Ohno et al. | |
| 2014/0355286 A1 | 12/2014 | Arita | |
| 2014/0362572 A1* | 12/2014 | Sun | F21S 41/148 362/245 |
| 2015/0023045 A1 | 1/2015 | Bauer et al. | |
| 2016/0084465 A1 | 3/2016 | Yamamoto | |

FOREIGN PATENT DOCUMENTS

| | | |
|---|---|---|
| CN | 101581428 A | 11/2009 |
| CN | 101936493 A | 1/2011 |
| CN | 102734732 A | 10/2012 |
| CN | 101776238 A | 7/2020 |
| DE | 1010024 B2 | 6/1957 |
| DE | 19745467 A1 | 4/1999 |
| DE | 202012101751 U | 8/2012 |
| EP | 0943068 A1 | 9/1999 |
| EP | 0997343 A2 | 5/2000 |
| EP | 1225386 A2 | 7/2002 |
| EP | 2028411 A2 | 2/2009 |
| EP | 2505910 A2 | 10/2012 |
| JP | 2000133017 A | 5/2000 |
| JP | 2002170409 A | 6/2002 |
| JP | 2007179993 A | 7/2007 |
| JP | 2007294202 A | 11/2007 |
| JP | 2011034875 A | 2/2011 |
| JP | 5513975 B2 | 11/2011 |
| JP | 2012114065 A | 6/2012 |
| JP | 2014041842 A | 3/2014 |
| JP | 2014082225 A | 5/2014 |
| WO | 9919664 A1 | 4/1999 |

OTHER PUBLICATIONS

International Search Report dated Nov. 4, 2015 in PCT/US2015/034439 filed Jun. 5, 2015, 6 pages.
Chinese Office Action dated Oct. 10, 2018, issued in Chinese Patent Application No. 201580030641.4 (with English translation).
Combined Chinese Office Action and Search Report dated May 29, 2019 in Patent Application No. 201580030641 .4 (with English language translation of Office Action only), 14 pages.
Chinese Office Action dated Sep. 27, 2019 in Chinese Patent Application No. 201580030641.4 (with English language translation), 8 pages.

\* cited by examiner

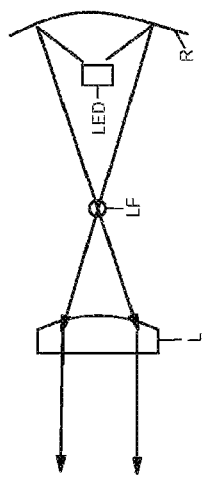
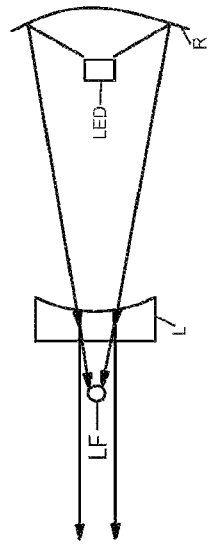
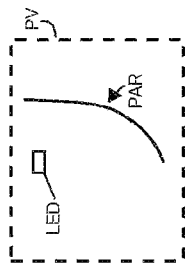
FIG 8
FIG 9
FIG 11
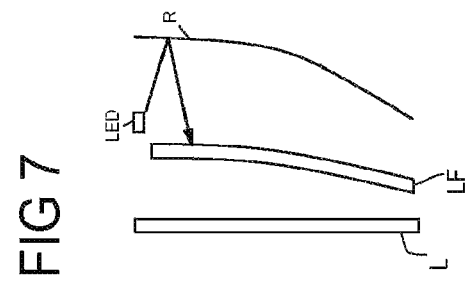
FIG 7
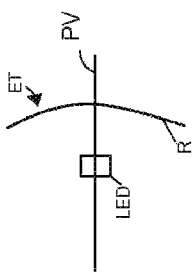
FIG 10
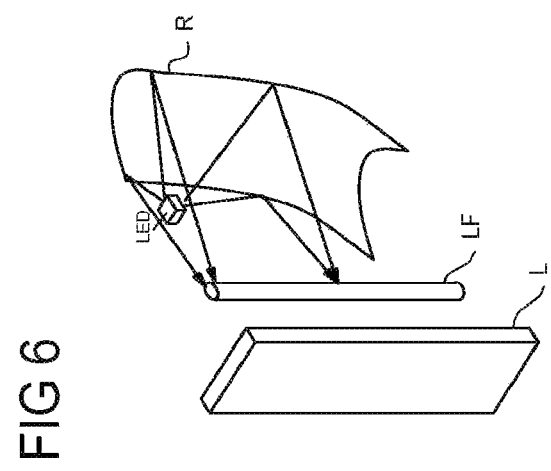
FIG 6

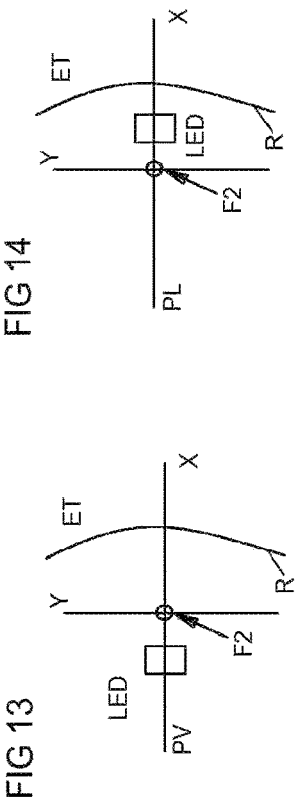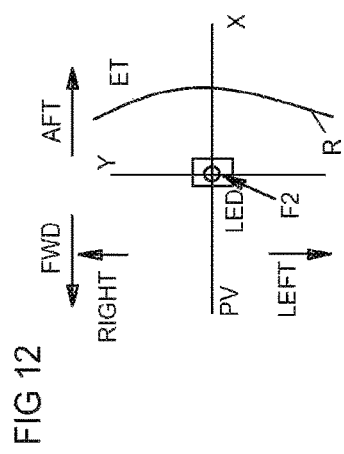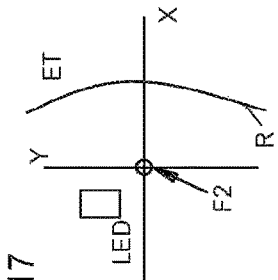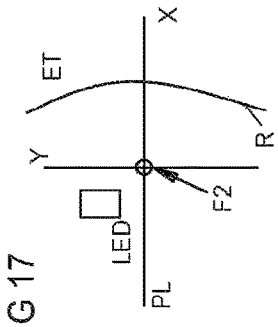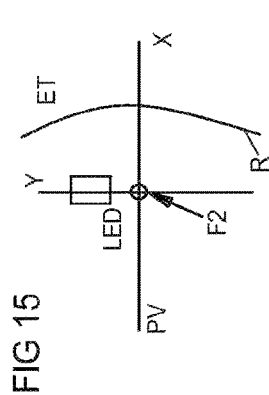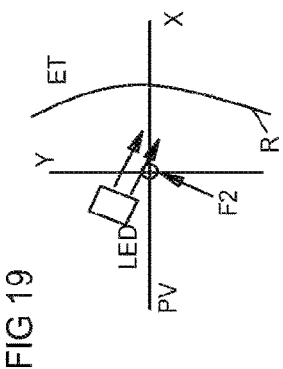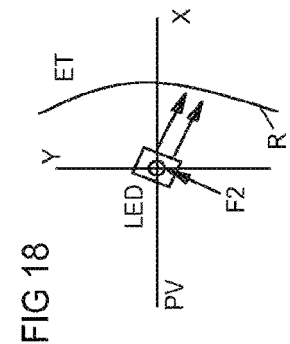

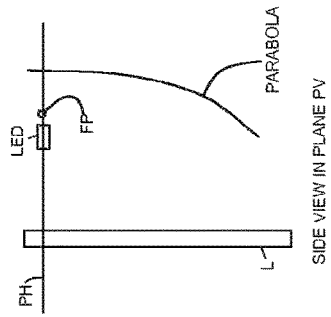
FIG 20
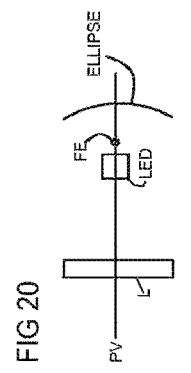
FIG 21
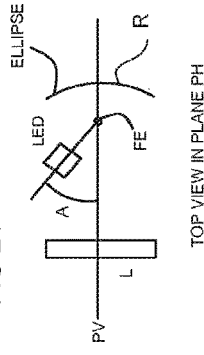
FIG 22
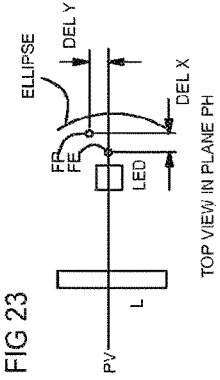
FIG 23
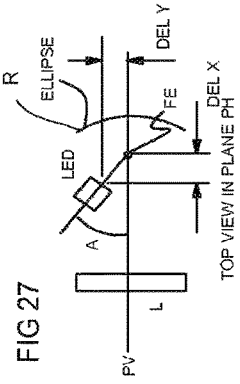
FIG 24
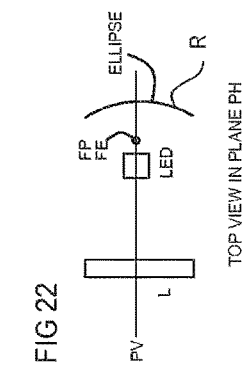
FIG 25
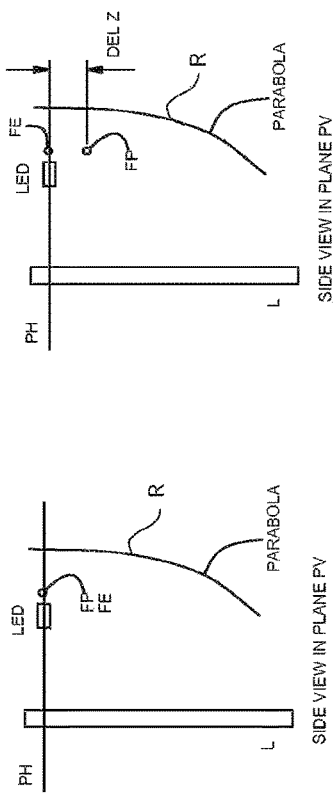
FIG 26
FIG 27

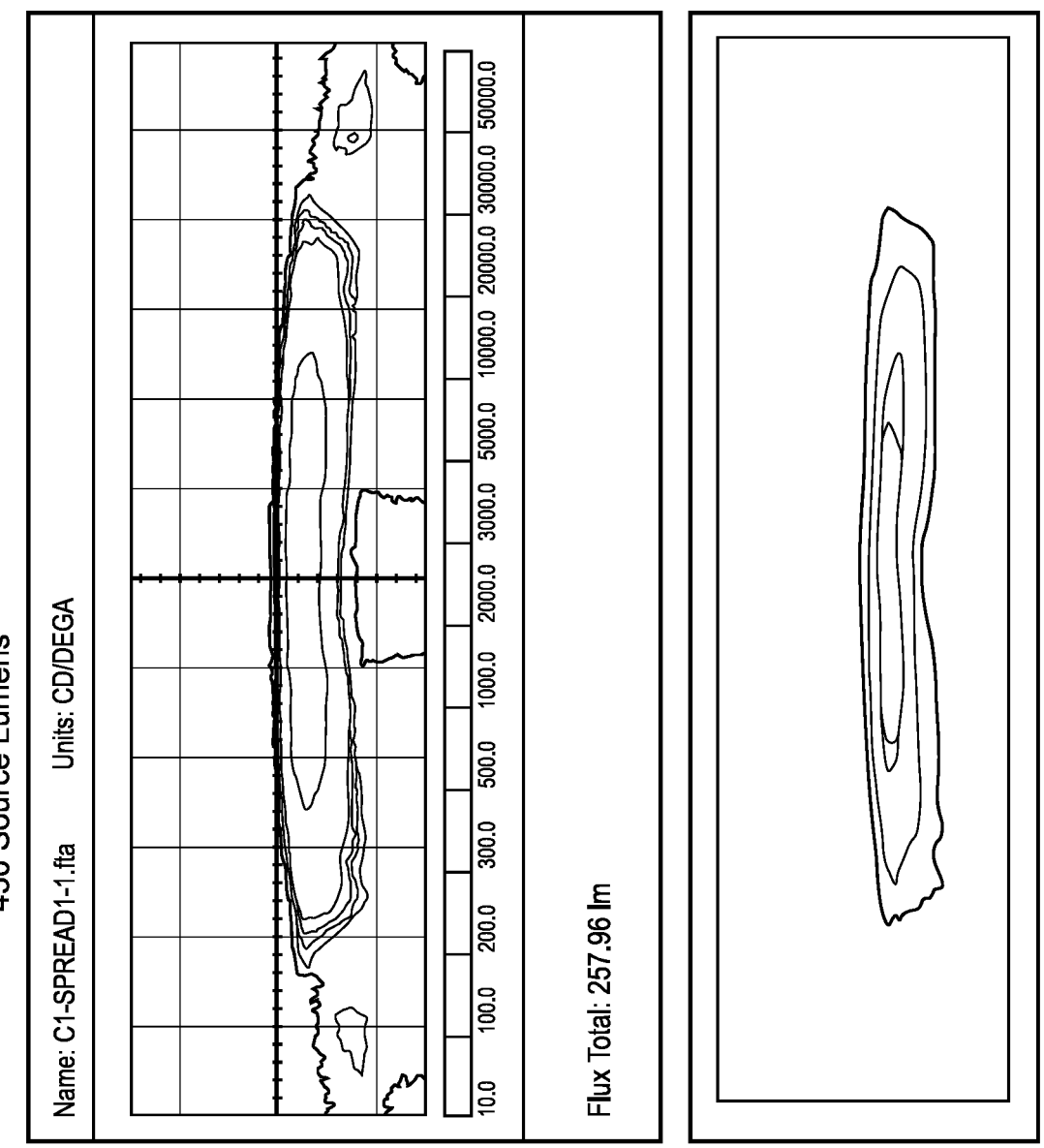
FIG 28A Spread V1 - Isocandela 450 Source Lumens

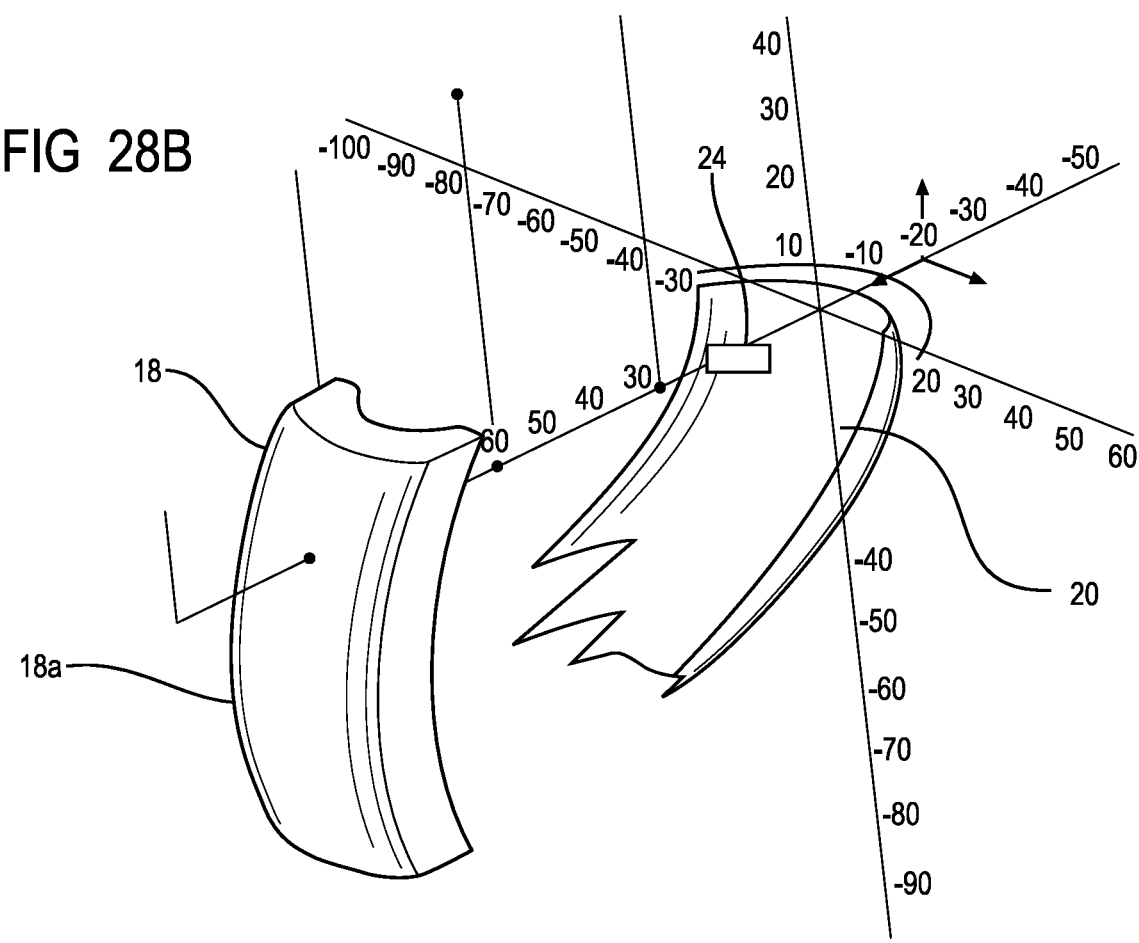

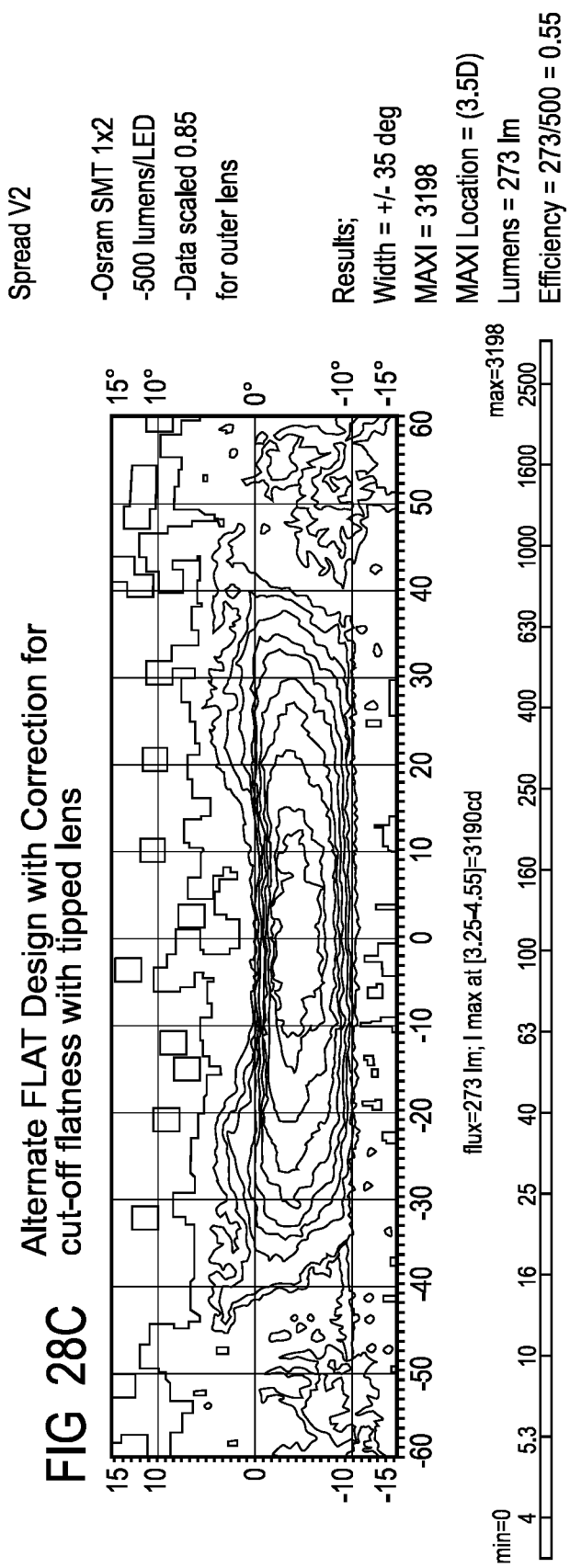

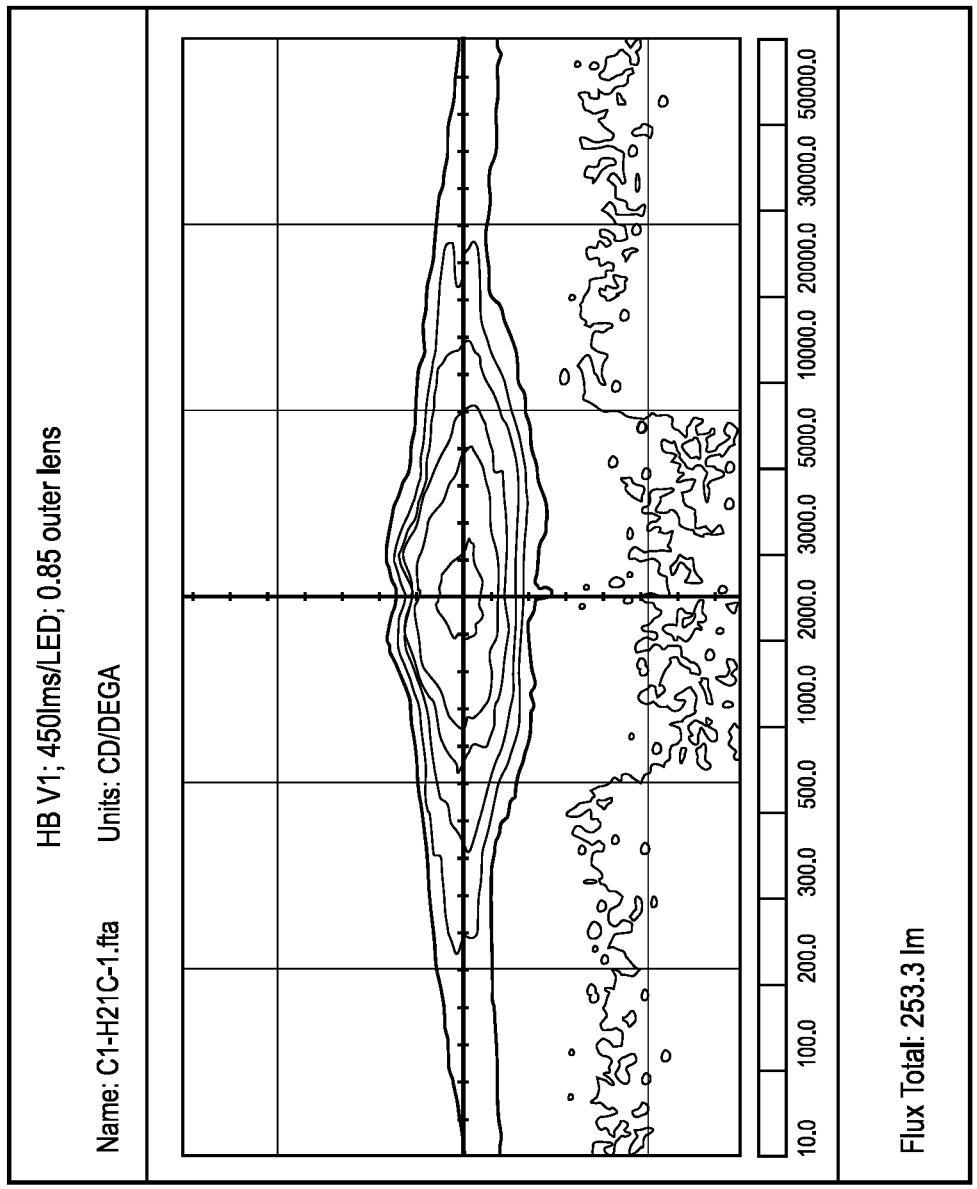

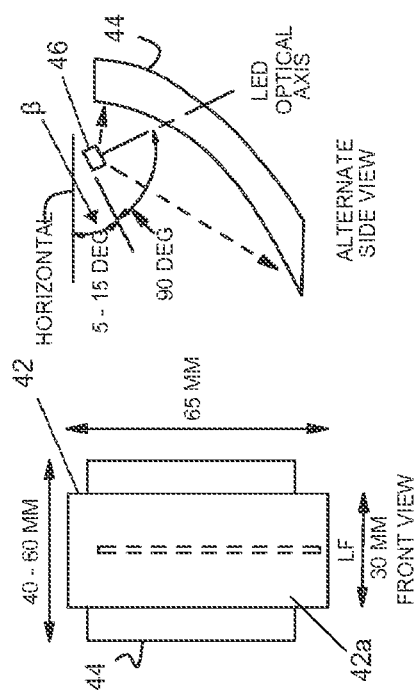
FIG 31A
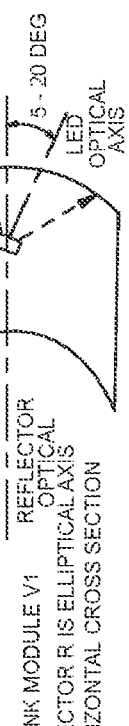
FIG 31B
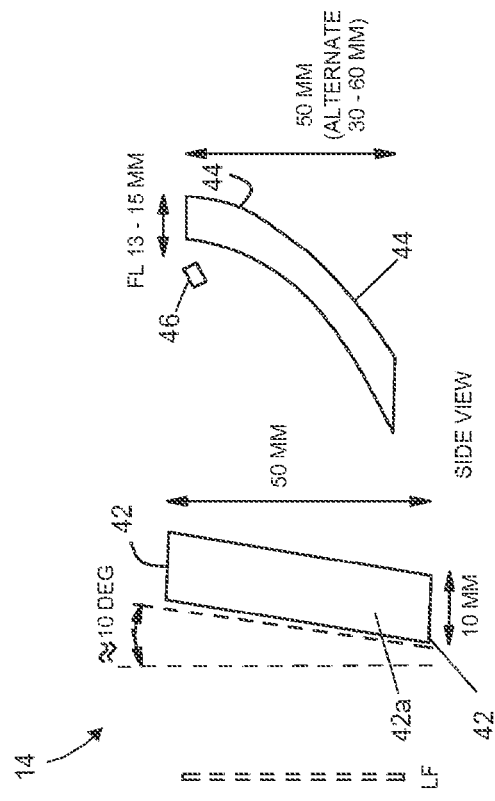
FIG 30
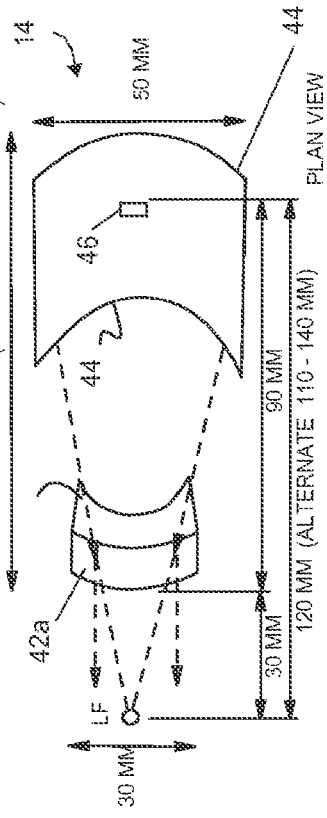

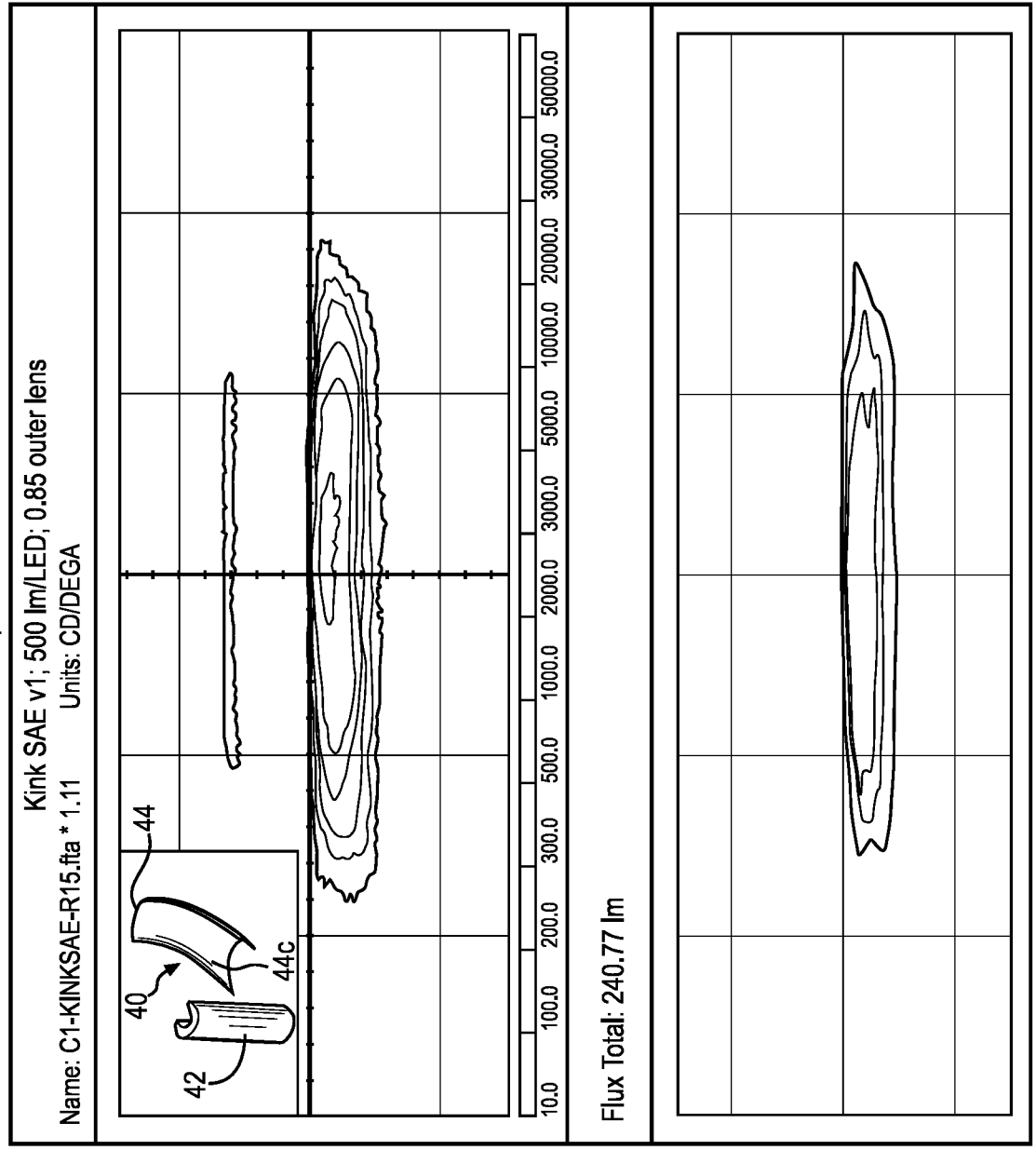

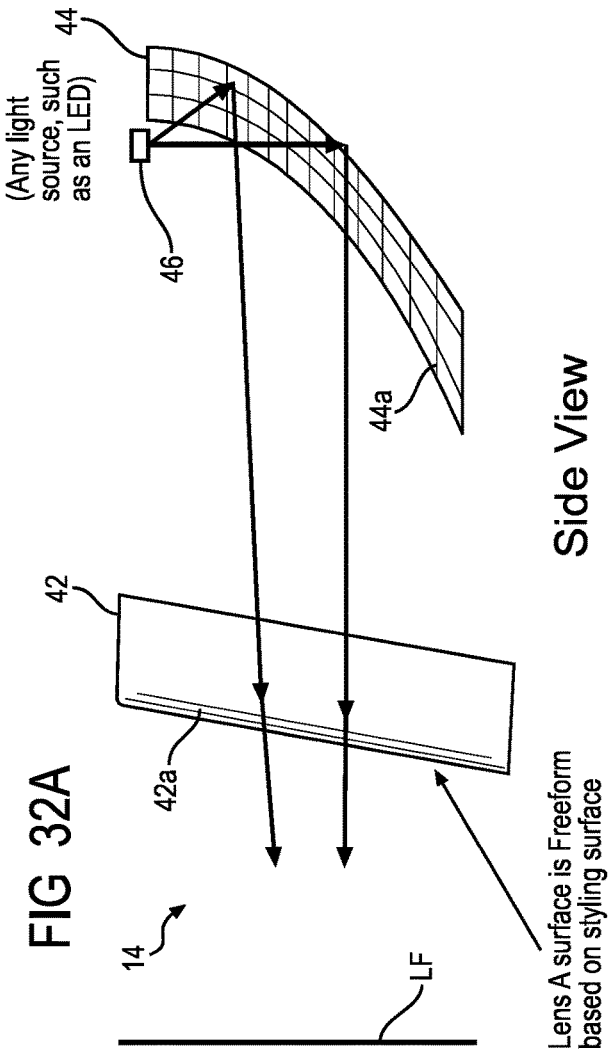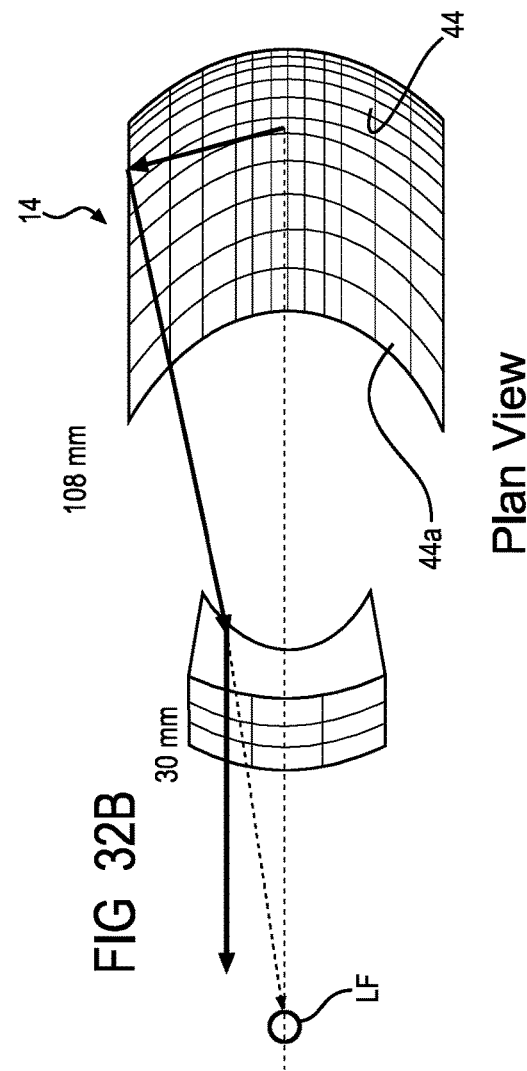

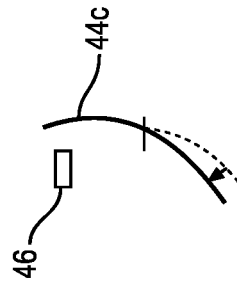
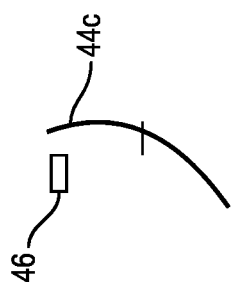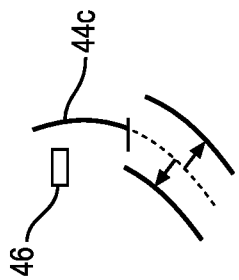
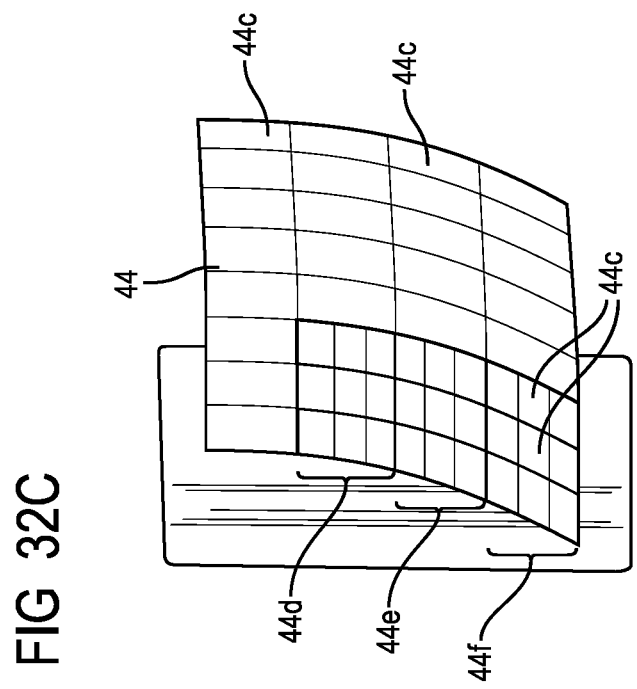

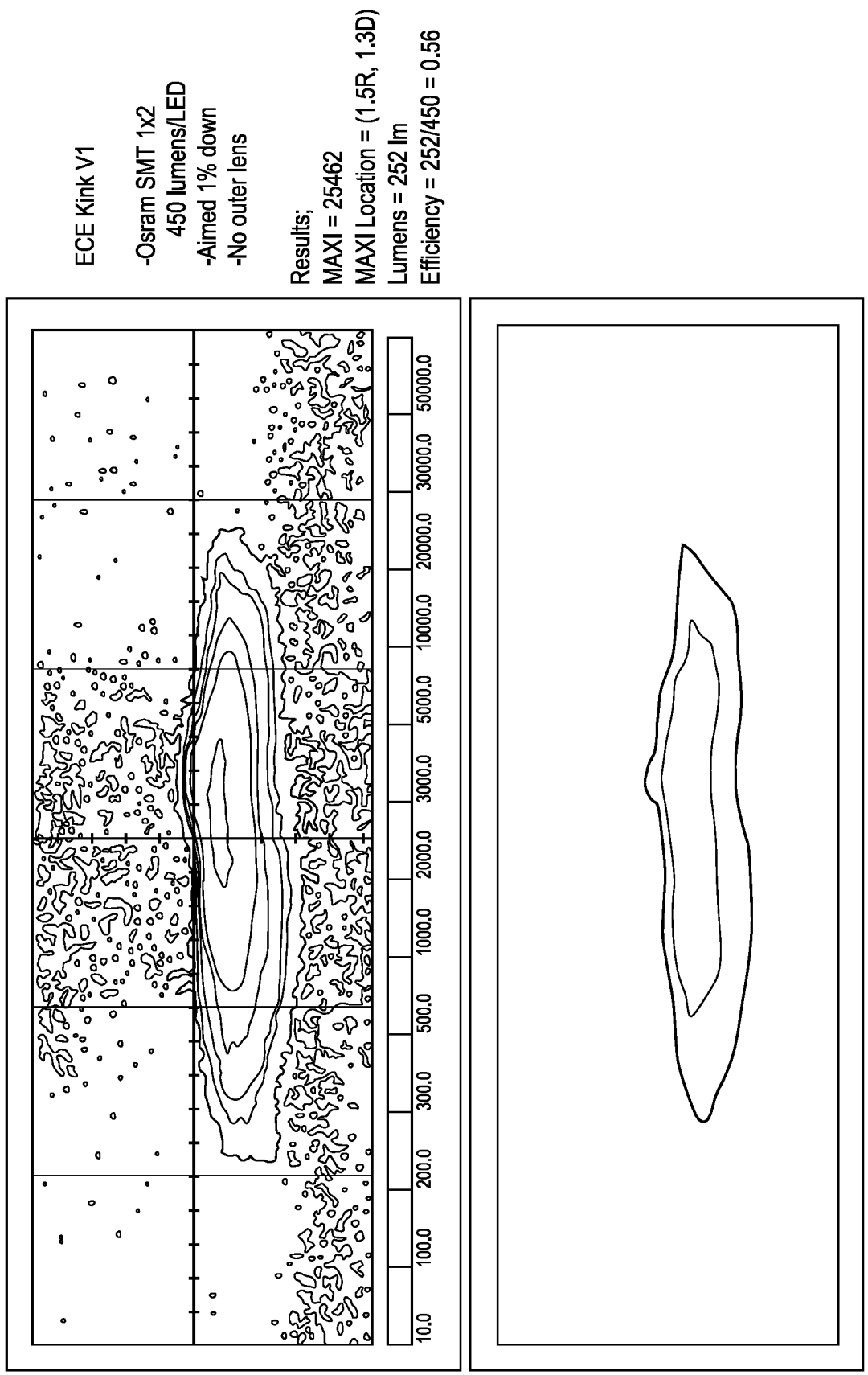
FIG 33C  Kink ECE Simulation Results
Nominal; 450 Source Lumens
ECE Kink V1
-Osram SMT 1x2
450 lumens/LED
-Aimed 1% down
-No outer lens
Results;
MAXI = 25462
MAXI Location = (1.5R, 1.3D)
Lumens = 252 lm
Efficiency = 252/450 = 0.56

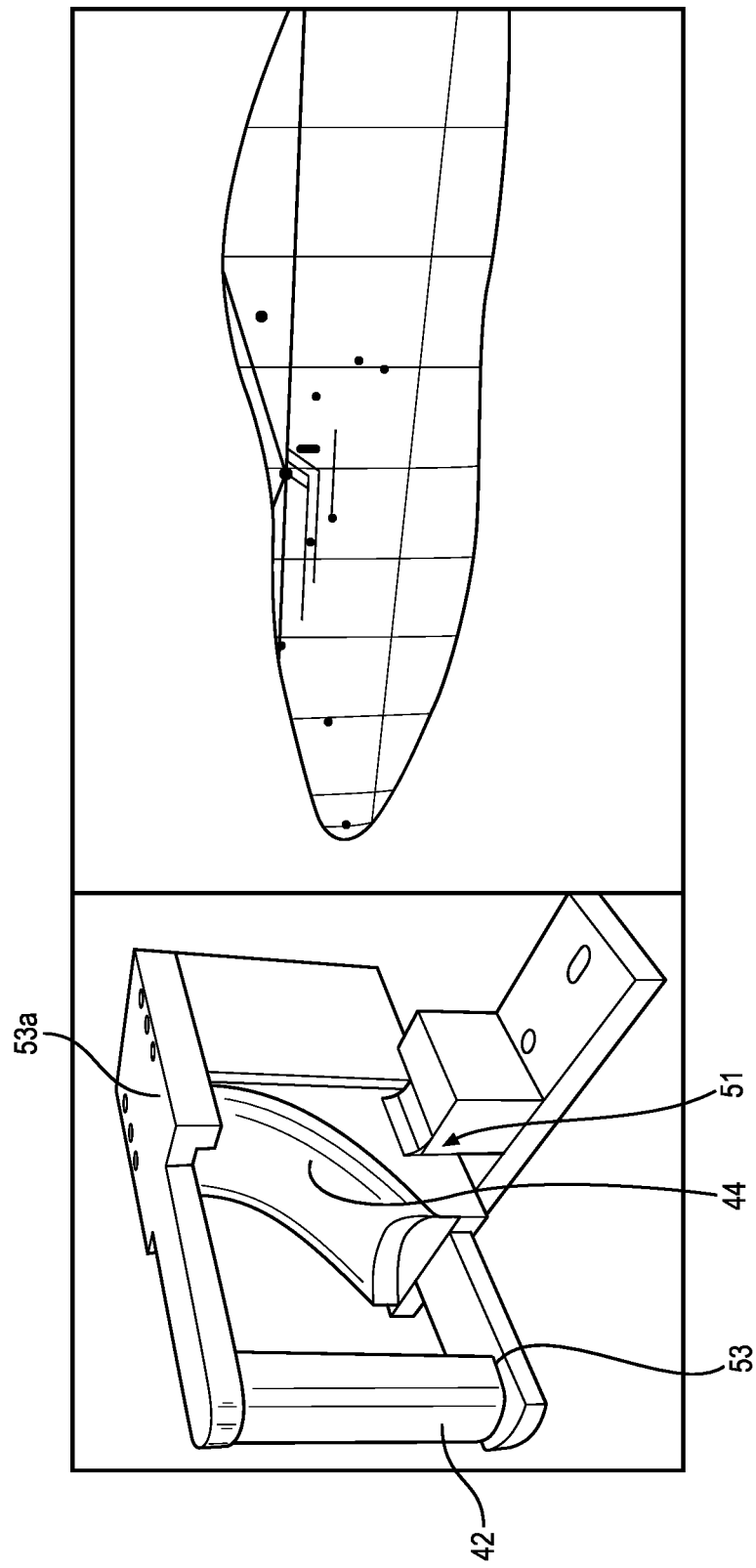
FIG 36  ECE Kink - Picture of Beam Pattern

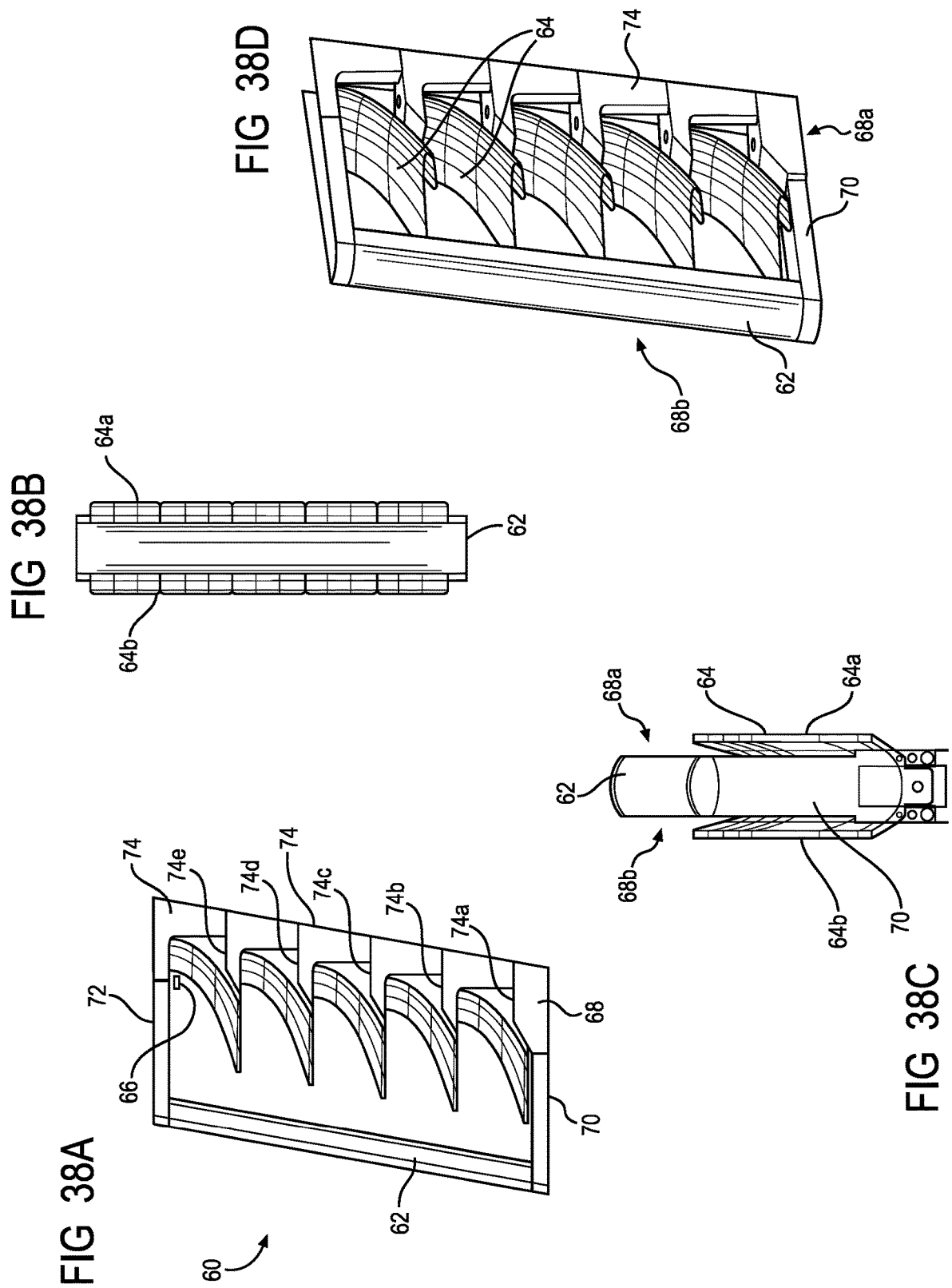

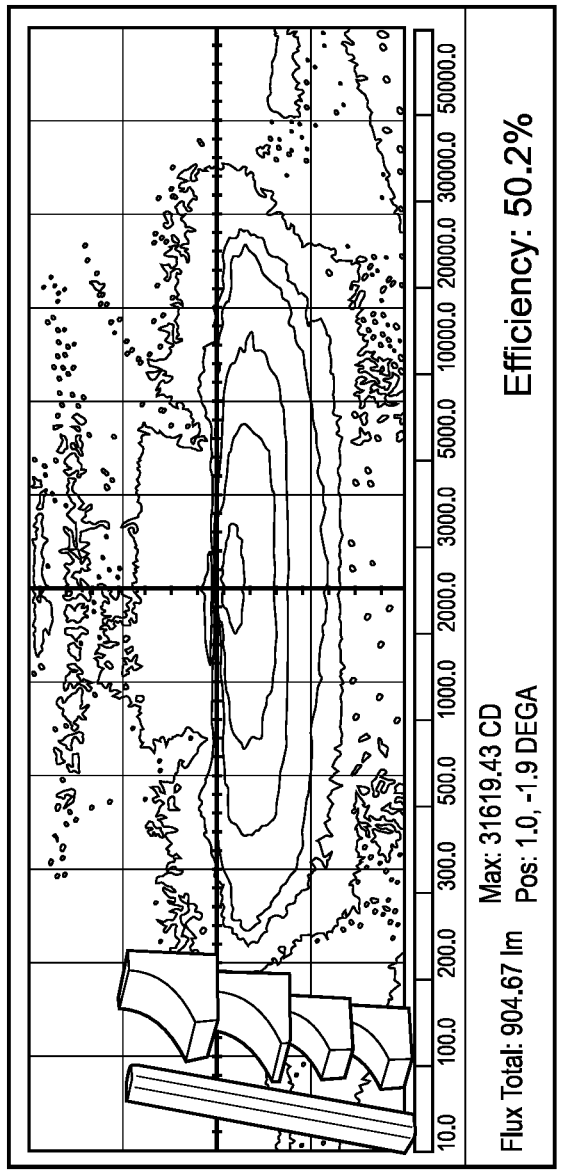

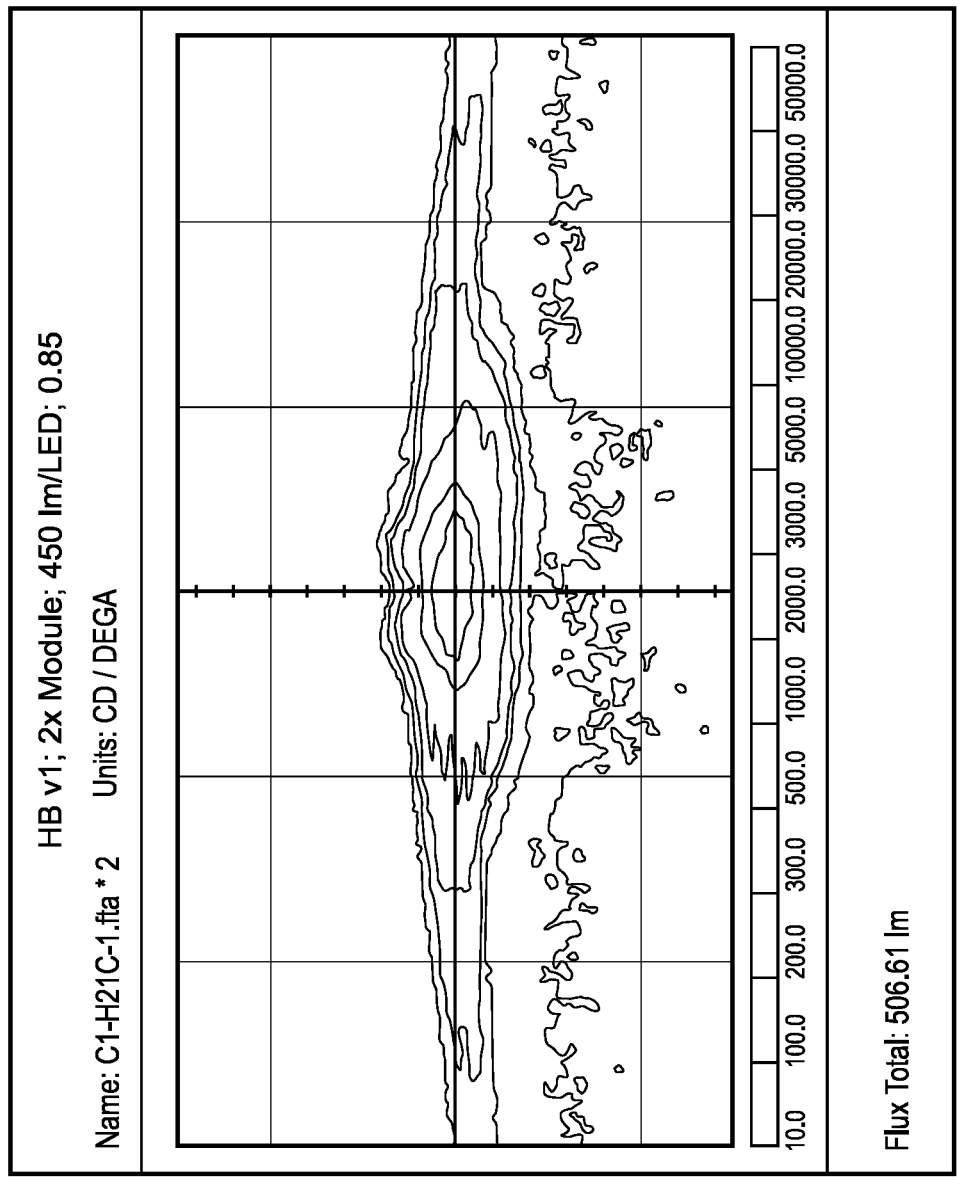

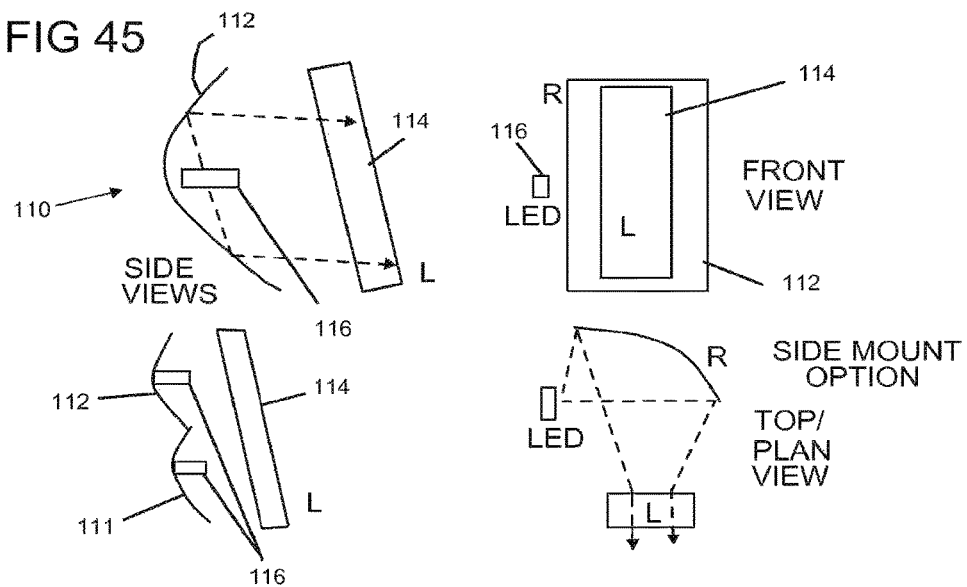
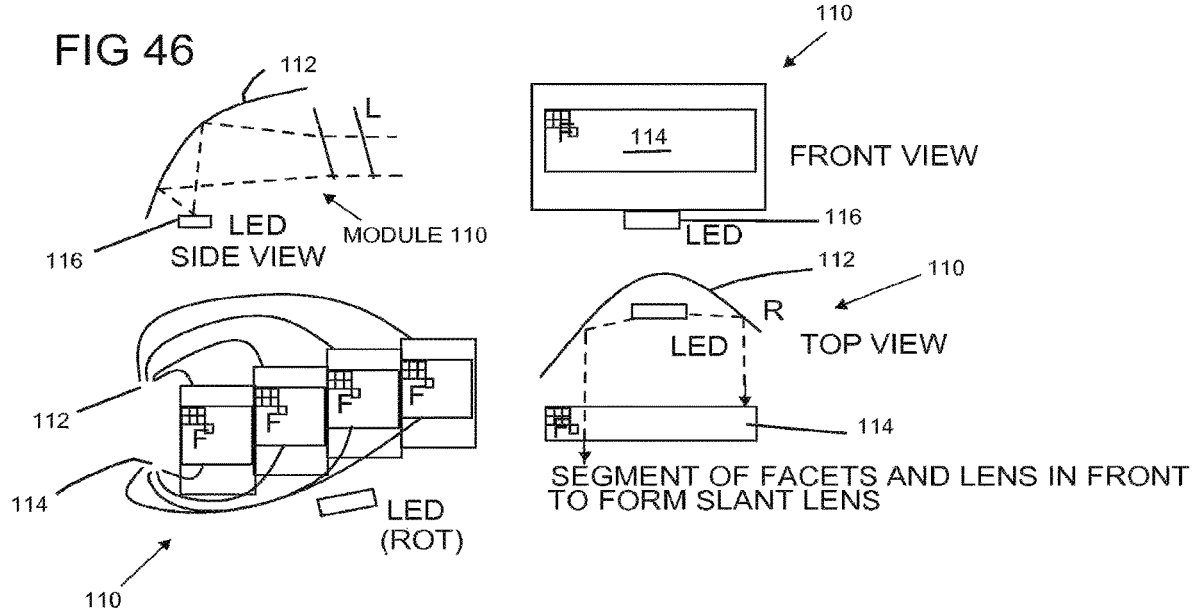

THIN ASPECT LIGHTING SYSTEM WITH CUTOFF

CROSS-REFERENCE TO RELATED APPLICATIONS

This application is a continuation of U.S. application Ser. No. 17/361,578 filed Jun. 29, 2021 (US20210396369), which is a continuation of U.S. application Ser. No. 16/849,065 filed Apr. 15, 2020 (US 2020/0355338), which is a continuation of U.S. application Ser. No. 15/316,738 filed Dec. 6, 2016 (U.S. Pat. No. 10,697,607), which is a U.S. National Phase Application of International Application No. PCT/US2015/034439 (WO 2015/034439) filed Jun. 5, 2015, which claims the benefit of U.S. Provisional Application No. 62/009,324 filed Jun. 8, 2014, the entire contents of which are incorporated herein by reference.

BACKGROUND

Field of the Invention

This invention relates to lighting systems, and more particularly, to a thin aspect forward lighting system with cutoff.

Description of the Related Art

At present, there are two large families of head-lights. A first family, those of headlights herein called "of the parabolic type", comprises headlights whose beam is mainly generated by a source of small dimensions mounted in a mirror which projects the rays onto the road in order to form the desired beam. The window of the headlight is involved, if necessary, by being fitted with prisms, striations, and the like, in order to model the beam, and in particular, in order to spread it widthwise. In this case, this family includes the headlights called "free-surface" or else "Surface Complexe" (registered trademark) headlights, having the ability of directly generating a beam delimited by a desired upper cut-off line.

These headlights have the properties of being able to generate beams of excellent quality in terms of light distribution, and of being, in general, not very deep. How-ever, in order to generate a sufficiently intense beam, it is necessary that their mirror or reflector recovers a significant proportion of the light flux emitted by the lamp.

A first approach to doing this consists in using a very small initial focal length, especially in order to obtain a mirror which is very close around the source and of small size widthwise. However, in this case, because of the large size of the images of the source generated by the mirror, the beam has in general an excessive thickness, and is in any case difficult to control.

A second approach to recovering the light flux while obtaining a thinner beam consists, on the contrary, in increasing the initial focal length, but in this case the mirror must have relatively large dimensions transversely to the optical axis, which is counter to the objective of a compact headlight.

A second family is that of headlights "of the elliptical type". Such headlights are characterized by a lamp mounted in a mirror which generates, with the reflected rays, a concentrated spot (typically, the source is at the first focus of a mirror in the shape of an ellipsoid of revolution and the spot is formed at the second focus of the mirror), and this spot is projected onto the road by a convergent lens, usually a plano-convex lens. If the beam has to comprise a cut-off line, the latter is produced by partly occluding the light spot where it is formed.

This second family of headlights has the advantage of being able to recover a significant proportion of the light flux emitted by the source, while having small dimensions transversely to the optical axis. On the other hand, the photometry of the beam may prove to be difficult to model, since by nature no correcting element of the prism or striated type can in general correct the light downstream of the lens; furthermore, these headlights have a large size depthwise.

Furthermore, in practice, these two families of headlights have very different external appearances.

Thus, the headlights of the parabolic type have a window with a relatively large width (while throughout the years, for reasons of style and aerodynamics, their height has gradually reduced). This window is striated or, in more recent styles, virtually smooth such that, when the headlight is extinguished, the mirror and various types of trims are observed perfectly on the inside.

In contrast, a headlight of the elliptical type, when it is extinguished, in general reveals only the outer convex face of the lens, which is often surrounded with a suitable trim, through a smooth window.

Nowadays, there are ever more demanding requests from designers relating to the appearance of illu-minating headlights for vehicles.

Thus certain style "trends" favor headlights of parabolic type, or of elliptical type, or even a combination or use of both types.

Moreover, on a more technical level, there is a strong demand for headlights having a size which is mod-erate not only transversely to the optical axis, but also depthwise, that is to say along the optical axis, which, in principle, neither of the two families of headlights men-tioned above is able to obtain without making concessions in terms of quality of illumination.

One solution of the prior art is found in U.S. Pat. Nos. 7,980,742; 7,168,836 and 6,811,289. The lens width is wider than requested by a customer and requires a diverging lens solution. The formation of a kink or elbow in the beam pattern is not demonstrated.

The following are some additional problems with prior art designs:

Conventional lens systems cannot be adapted to customer styling for thin lens elements.

Conventional lens systems (imaging/projection lens systems) have color dispersion that may be objec-tionable when driving or must be managed in the design using more complex lenses.

Conventional lens systems require more complex molding.

The invention herein overcomes one or more of the problems of the prior art.

SUMMARY

One embodiment of the present disclosure features an external light for a vehicle, comprising: a) a reflector which has (i) generally parabolic sections in side view and (ii) generally elliptical sections in top view, and (iii) a focus; b) at least one light source, part of which is coincident with the focus, and which projects light which the reflector reflects to form a focused line; c) a converging lens, non-parallel with the focused line, which transmits light from the focused line externally, to form a beam having at least one cut-off. In all the embodiments being described, it should be understood that the light source may be any suitable light source, such as a light-emitting diode (LED), a non-solid state light source or a solid state light source, such as a laser LED.

As is known to one skilled in the art, the cut-off is a defined line of cut-off below which light from the head-lamp assembly is projected. In general, the light output is below the cut-off which is below the eyes of a driver in an oncoming vehicle. As is known, the cut-off for European countries is typically stepped or has a kink or elbow to facilitate illuminating a side of the road where road signs and pedestrians are and lower oncoming traffic. In the United States, such a pronounced kink or elbow is not a regulatory requirement.

This embodiment shown and described herein could be used alone or together and/or in combination with one or more of the features covered by one or more of the claims set forth herein, including but not limited to one or more of the following features or steps:

The external light for a vehicle in which intensity in at least one cut-off drops by at least 50 percent within 10 degrees of beam width.

The external light for a vehicle in which the at least one light source comprises one or more light emitting diodes.

The external light for a vehicle in which the converging lens forms part of an external surface of the vehicle.

The external light for a vehicle in which the converging lens is exposed to external weathering along with external surfaces of the vehicle.

In another embodiment, an external light for a vehicle, comprising a) a reflector which has (i) generally parabolic sections in side view, (ii) generally elliptical sections in top view, and (iii) a focus; b) at least one light source comprising a light emitting diode, LED, part of which is coincident with the focus, and which projects light which the reflector reflects to form a focused line; and c) an elongated lens, which (1) has neutral power along its length, (2) has a relatively narrow aspect ratio, and (3) which transmits light received from the focused line to form a beam having a relatively wide aspect ratio, and having left and right cut-offs.

This embodiment shown and described herein could be used alone or together and/or in combination with one or more of the features covered by one or more of the claims set forth herein, including but not limited to one or more of the following features or steps:

The external light for a vehicle in which the elongated lens is not parallel with the focused line.

The external light for a vehicle in which light intensity in the cut-offs drops by 50 percent within 10 degrees of beam width.

The external light for a vehicle in which the elongated lens is closer to the focused line at one end of the lens, compared with the other end.

The external light for a vehicle in which the reflector comprises segments.

In still another embodiment, a light device for a vehicle is provided and it comprises a) at least one light source; b) a reflector which receives light from the light source and focuses the light to form a line in space; and c) a lens which receives light from the line, and projects it forward of the vehicle.

In yet another embodiment, a lighting module for a vehicle is shown comprising a) a first light source which transmits light to a first reflector, which focuses the light along a first line in space; b) a second light source which transmits light to a second reflector, having different geometry than the first reflector, which focuses the light along a second line in space; c) a lens which i) receives light from the first line and projects the light in a first intensity pattern, and ii) receives light from the second line and projects the light in a second intensity pattern, different from the first.

This embodiment shown and described herein could be used alone or together and/or in combination with one or more of the features covered by one or more of the claims set forth herein, including but not limited to one or more of the following features or steps:

The lighting module for a vehicle in which the first reflector comprises parabolic sections in side view and elliptical sections in top view.

The lighting module for a vehicle in which the second reflector comprises parabolic sections in side view and elliptical sections in top view.

The lighting module for a vehicle in which the first intensity pattern has left and right cut-offs, and the second intensify pattern has left and right cut-offs, which are different from those of the first intensity pattern.

The lighting module for a vehicle in which the lens is elongated, and generally non-parallel with the first line.

Another embodiment comprises a lighting device for a vehicle, comprising a reflector which is generally parabolic in a first section, generally elliptical in a second section and has a focus, at least one light source which projects light to the reflector which the reflector reflects to form a line of focus, and a lens which transmits light from the line of focus to form a beam having at least one cut-off.

As used herein, a line of focus refers to a combined reflection of light from the elliptical cross-section and the parabolic cross-section to produce a line of focused light LF as illustrated in the Figures, such as FIG. 6.

Another embodiment comprises a lighting device for a vehicle, comprising a first light source which transmits light to a first reflector, which focuses light along a first line of focus in space, a second light source which transmits light to a second reflector, having different geometry than the first reflector, which focuses light along a second line of focus in space, a lens which i) receives light from the first line of focus and projects the light in a first intensity pattern, and ii) receives light from the second line of focus and projects the light in a second intensity pattern, different from the first.

In another aspect, one embodiment comprises a lighting device for a vehicle comprising a reflector which is elliptical in a first cross-section and parabolic in a second cross-section that is substantially perpendicular to the first cross-section and having an optical axis defined therein, and at least one light source which projects light toward the reflector along a projection axis which deviates between 5 and 20 degrees from an optical axis, and a diverging lens which collects light received from the reflector and diffracts the light into a less converging beam.

In still another aspect, one embodiment comprises a lighting device for a vehicle comprising a reflector having a surface which is elliptical in a first cross-section and parabolic in a second cross-section that is substantially perpendicular to the first cross-section, the reflector having a plurality of reflective facets, each positioned along a geometric surface of the reflector, such that fewer than all surface normals of the plurality of reflective facets are aligned with surface normals of the geometric surface at the respective locations of the plurality of reflective facets, at least one light-emitting diode (LED) which projects light to the plurality of reflective facets, and a lens which collects light from the plurality of reflective facets and collimates the light. In this regard, it is known that a surface normal refers to a surface at a point that is perpendicular to a plane.

In still another aspect, one embodiment comprises a lighting device for use on a vehicle; the lighting device comprising at least one module comprising a reflector that is generally elliptical in a first cross-section and generally parabolic in a second cross-section that is generally perpendicular to the first cross-section, the reflector receiving light from at least one light source and directing it to provide a line of focused light, and a lens that is situated in operative relationship with the reflector and the line of focused light in order to generate a desired light beam.

In still another aspect, one embodiment comprises a lighting device for use on a vehicle, the lighting device comprising a plurality of modules, each comprising a reflector that is generally elliptical in a first cross-section and generally parabolic in a second cross-section that is generally perpendicular to the first cross-section, the reflector receiving light from at least one light source and directing it to provide a line of focused light, and a lens that is situated in operative relationship with the reflector and the line of focus, each of the plurality of modules generating a light beam pattern, and the light beam pattern from the plurality of modules cooperate to generate a composite beam pattern.

This invention, including all embodiments shown and described herein, could be used alone or together and/or in combination with one or more of the features covered by one or more of the following list of features:

The lighting device wherein the lens is tilted off a vertical plane toward the reflector by 20 degrees or less.

The lighting device wherein the at least one light source comprises one or more light emitting diodes.

The lighting device wherein the lens comprises a side that forms part of an external surface of the vehicle.

The lighting device wherein the lens is at least one of either divergent or convergent.

The lighting device wherein the line of focus is between the reflector and the lens.

The lighting device wherein the line of focus is outside the lens.

The lighting device wherein the lens has a length that is greater than a length of the reflector such that a ratio of lens length to reflector length is greater than or equal to 1.

The lighting device wherein the lens has a width that is greater than a width of the lens such that a ratio of reflector width to lens width is greater than or equal to 1.

The lighting device wherein the at least one light source is rotated relative to a focus of the reflector in at least one of a vertical plane or a horizontal plane.

The lighting device wherein the at least one light source is rotated in only in a horizontal plane to provide a kink in the beam.

The lighting device wherein the lens has a thin aspect and is generally narrow along its length.

The lighting device wherein the lens is closer to the line of focus at one end of the lens compared with the other end.

The lighting device wherein the reflector comprises a plurality of segments or facets.

The lighting device wherein at least one of the plurality of segments or facets is aimed or deviated from an optical axis of the reflector or is defocused. As is known in the art, with a parabolic reflector, light at a focus of the parabola will be collimated and reflected to infinity gener-ally parallel to the optical axis. With "defocused" light, such as by moving the at least one light source relative to the focus, light rays go to another focus in space either up, down or sideways relative to the optical axis of the reflector. Thus, by defocusing, the image from the at least one light source can be directed to provide a portion of the overall light beam pattern. In the illustration being described, the at least one light source is defocused to provide the kink or elbow described herein. As explained later herein, a manipulation of one or more portions of the reflector can also facilitate providing unique characteristics to the beam pattern, such as the kink or elbow just mentioned.

The lighting device wherein the lens is inclined relative to the reflector. In this regard, the lens may comprise a longitudinal axis that may be inclined relative to the reflector such that a first end of the lens is closer to the reflector than a second end of the lens. If the axis of the lens is generally vertical, for example, then the axis would be inclined or tilted away from vertical at an angle. In the illustrations being described, the angle of inclination is typically less than 20 degrees (20°) and in some embodiments approximately ten degrees (10°).

The lighting device wherein the first section is a horizontal section and the second section is a vertical section.

The lighting device wherein the first reflector comprises parabolic sections in side view or vertical section and elliptical in top view or horizontal section.

The lighting device wherein the second reflector comprises parabolic sections in side view or vertical section and elliptical in top view or horizontal section.

The lighting device wherein the first intensity pattern has left and right cut-offs and the second intensity pattern has left and right cut-offs, which are different from those of the first intensity pattern.

The lighting device wherein the lens is elongated and is generally non-parallel with at least one of the first line of focus or the second line of focus.

The lighting device wherein the first intensity pattern comprises a kink, whereas the second intensity pattern does not.

The lighting device wherein the diverging lens diffracts the light into a beam containing parallel rays.

The lighting device wherein the at least one light source comprises at least one light-emitting diode (LED) and the projection axis of the at least one light source lies in a horizontal plane.

The lighting device wherein the projection axis of the at least one light source is deviated from the optical axis of the reflector by 5 to 15 degrees.

The lighting device wherein the plurality of reflective facets collectively have an optical axis and the at least one light-emitting diode (LED) has a projection axis which deviates from the optical axis horizontally by 5 to 20 degrees.

The lighting device wherein the at least one light source is at least one of an LED or a solid state device.

The lighting device wherein the line of focused light is between the reflector and the lens.

The lighting device wherein the line of focused light is outside an external surface of the lens and not between the lens and the reflector.

The lighting device wherein the lens is a divergent lens and the at least one module generates at least one of a flat beam pattern, a high beam pattern or a low beam pattern.

The lighting device wherein the lens is a convergent lens and the at least one module at least one of a flat beam pattern, a high beam pattern or a low beam pattern.

The lighting device wherein the reflector has a plurality of facets, at least one of which is configured and dimensioned to generate a predetermined charac-teristic in the light beam.

The lighting device wherein the predetermined characteristic comprises a kink or elbow.

The lighting device wherein the at least one light source is deviated or angled in at least one plane to cause the light beam to be defocused or to have a predetermined feature.

The lighting device wherein the at least one light source is deviated or angled in a horizontal plane that is generally parallel to an optical axis of the reflector and the predetermined feature is a kink or elbow.

The lighting device wherein the light beam is at least one of a flat beam pattern, a high beam pattern, a beam pattern having a kink or elbow or a low beam pattern that conforms to SAE or ECE beam pattern requirements.

The lighting device wherein the first cross-section is taken in a horizontal plane and the second cross-section is taken in a vertical plane.

The lighting device wherein the at least one module is at least one of a low beam module, a high beam module or a flat beam module.

The lighting device wherein the lighting device comprises at least one second module, the at least one module and the at least one second module generating different beam patterns.

The lighting device wherein the at least one module generates a flat beam and the at least one second module generates a low beam.

The lighting device wherein the low beam comprises a kink or elbow.

The lighting device wherein the lighting device comprises at least one third module that generates a third beam that is different from the beams generated by the at least one first module and the at least one second module.

The lighting device wherein the plurality of modules each utilize the same lens but separate reflec-tors.

The lighting device wherein the plurality of modules comprises a first module that generates a first beam pattern and at least one second module that generates a second beam pattern, the first and second beam patterns being the same.

The lighting device wherein the plurality of modules comprises a first module that generates a first beam pattern and at least one second module that generates a second beam pattern, the first and second beam patterns being different.

The lighting device wherein the lenses for the plurality of modules are integral and continuous.

The lighting device wherein the first module is a flat module and the first beam pattern is a flat beam pattern, the at least one second module is a low beam module and the second beam pattern is a low beam pattern the composite beam pattern including both the flat beam pattern and the low beam pattern.

The lighting device wherein a common lens is used for both the first module and the at least one second module.

The lighting device wherein low beam pattern comprises a kink or elbow.

The lighting device wherein the reflector of the at least one second module comprises a plurality of facets, the kink being generated by adapting a shape or direction of at least one of the facets.

The lighting device wherein the kink being generated by angling a position of the at least one light source relative to a focus of the reflector of the at least one second module.

The lighting device wherein the plurality of modules comprise at least one high beam module for generating a high beam, at least one flat beam module for generating a flat beam, and at least one low beam module for generating a low beam, the plurality of modules being adapted to be energized simultaneously or independently to generate the composite beam.

The lighting device wherein the plurality of modules are stacked.

These and other objects and advantages of the invention will be apparent from the following description, the accompanying drawings and the appended claims.

BRIEF DESCRIPTION OF THE DRAWINGS

FIG. 6 illustrates how light transmitted by an light source is reflected by the reflector R to a line of focused light, called a line focus labeled LF;

FIG. 7 shows that the line focus LF need not be linear;

FIG. 8 shows the line focus LF located between the lens L and the reflector R, and illustrates one cross-sectional shape of the lens L of FIG. 1;

FIG. 9 shows the line focus LF located beyond the lens L, and illustrates another cross-sectional shape of the lens L;

FIG. 10 illustrates a reference vertical plane PV;

FIG. 11 is a top view of FIG. 10;

FIG. 12 is a side view of FIG. 10;

FIG. 13 illustrates the light source located at the focus F2 of the truncated ellipse ET of FIGS. 1 and 3;

FIGS. 14, 15, 16, and 17 illustrate the light source displaced forward, aft, right and left of the focus F2, respectively;

FIGS. 18 and 19 show the light source displaced and/or at an angle relative to the major axis of the truncated ellipse, but located at the focus F2;

FIGS. 20-27 illustrate the light source displaced from an elliptical focus and a parabolic focus, and in some views angled relative to an optical axis of the reflector.

FIGS. 28A-28C are light beam intensity plots or pictures showing the beam generated by the module of FIG. 28;

FIG. 29A is a light beam intensity plot for the light beam shown in FIG. 29;

FIG. 30 is a module in accordance with another embodiment for producing a low beam pattern;

FIG. 30A is a light beam intensity plot and associated picture for the embodiment shown in FIG. 30;

FIGS. 31A-31B are alternative embodiments of the module shown in FIG. 30;

FIGS. 32A-32F are views of another embodiment showing the reflector with a plurality of facets;

FIG. 33A-33C are intensity beam plots showing a kink produced using an embodiment where the at least one light source position is angled relative to a focus of the reflector;

FIG. 36 is a test picture and associated intensity beam picture showing a light beam with kink;

FIGS. 38A-38D and 39A-39B illustrate various embodiments wherein a plurality of modules are combined, such as in a stacked configuration, and used with a single lens;

FIGS. 39C-39E are various light intensity plots for the embodiments shown in FIGS. 39A and 39B;

FIG. 41 is a light beam intensity plot for the embodiment shown in FIG. 40;

FIGS. 43-46 illustrate different embodiments of the invention;

DETAILED DESCRIPTION

The invention improves over various prior art devices, including those shown in U.S. Pat. No. 7,980,742, to Albou, issued Jul. 19, 2011; U.S. Pat. No. 7,121,705 to Albou, issued October, 2006; U.S. Pat. No. 7,390,112, to Leleve, issued June, 2008; and U.S. Pat. No. 7,524,095, to Albou, issued April 2009, all of which are incorporated herein by reference and made a part hereof.

The invention concerns a "thin aspect" headlight or other lighting and/or signaling devices, hereinafter collectively referred to as a lighting device, for vehicles. The "aspect" in "thin aspect" refers to "aspect ratio," which is the ratio of height H to width W, or H/W. Thus, a thin aspect ratio refers to a headlight which is tall and narrow. However, despite the fact that the thin aspect light is tall and narrow, the lighting device provides a beam pattern that conforms to SAE and/or ECE standards. The beam is typically short and wide. That is, a thin aspect lighting device, which is tall and narrow, generally produces a typical beam which has a wide aspect and is short and wide light beam. In the illustrative embodiments, the aspect ratio of lens height to reflector width is greater than or equal to 1. Also, the ratio of reflector width to lens width is also greater than or equal to 1.

Another feature of the embodiments being described is that the thin aspect light utilizes a lens, such as a cylindrical lens, divergent or convergent lens, which can have an outer surface that is adapted or shaped to follow a contour or surface of the vehicle for styling purposes and aerodynamic benefits.

In general, the lighting device of the embodiments described herein provides a main headlamp beam, such as a high beam, a low beam or a low beam with kink or an elbow. In other embodiments described later, the lighting device allows light to be guided or passed through the lens at a direction that is generally cross or transverse to the main beam to provide a secondary lighting function, such as a daytime running light (DRL), turn signal, park light or the like. Some general principles of operation of the invention will now be described to facilitate understanding of the various features of the invention.

Figure 1:
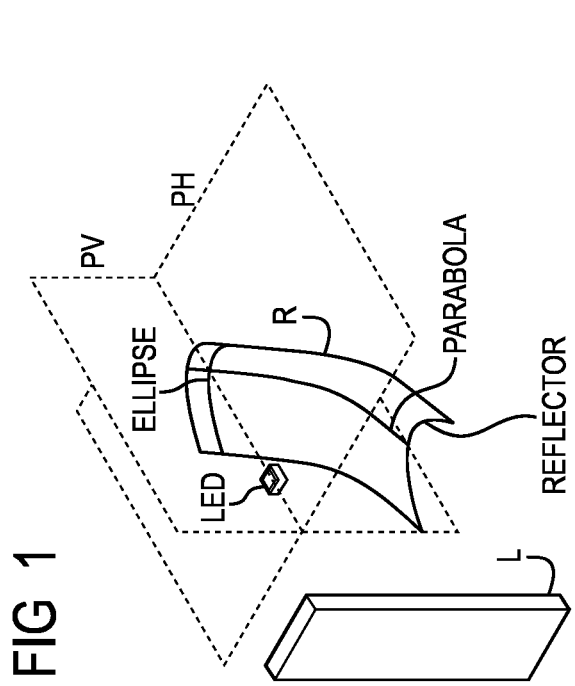
FIG. 1 is a perspective view of a generalized representation of one form of the invention, showing (1) a reflector R, which is elliptical in horizontal cross-section and parabolic in vertical cross-section, (2) a generalized lens L, and (3) a light emitting diode LED.

FIG. 1 is a simplified diagram of one form of the invention. At least one light source projects light to a reflector R, which reflects the light to a lens L, shown as a block for ease of illustrating basic principles of the invention. In all the embodiments being described, it should be understood that the at least one light source may be any suitable light source, such as a light-emitting diode (LED), a non-solid state light source or a solid state light source, such as a laser LED. As will be understood from the description below, the lens L may be, for example, a convergent lens or a divergent lens. The lens L focuses the light into a beam of appropriate cross-sectional shape to be shown later.

Figure 2:
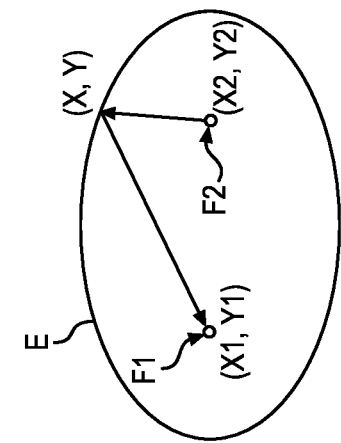
FIG. 2 illustrates an ellipse, showing how light originating at focus F2 will be reflected to focus F1.

The reflector R is constructed with a specific shape. In a horizontal plane or cross-section PH, the shape is elliptical as shown. In a vertical plane or cross-section PV, the shape is parabolic as shown. The elliptical cross-section exploits a specific characteristic of an ellipse and the parabolic cross-section exploits specific characteristics of a parabola. In this regard and as shown in FIG. 2, the ellipse E has a first focus F1 and a second focus F2. A light ray originating at focus F2 of the ellipse E will always be reflected to its other focus F1, no matter in what direction the ray travels away from the originating focus F2. This reflective property is present, even if the ellipse is truncated into the truncated ellipse ET in FIG. 3. Therefore, as in FIG. 4, light originating from a light source located at focus F2 will be focused to the second focus F1.

Figure 5:
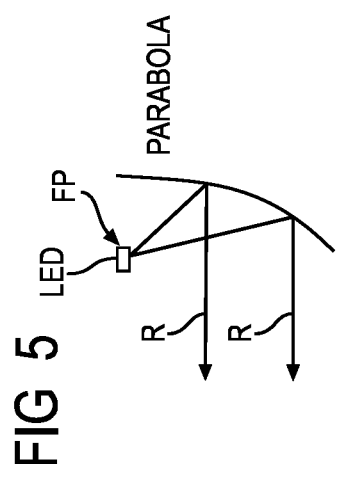
FIG. 5 shows how light originating at a focus FP of a parabola P (FIG. 1) is reflected as parallel rays R.

The parabolic cross-section in plane PV exploits a specific characteristic of the parabola, namely, that light originating at the focus FP of a parabola will be reflected as parallel rays. FIG. 5 illustrates this characteristic. If the light source is located at the focus FP, then rays R will be parallel after reflection.

FIG. 6 illustrates the combined reflections. The result is that a line focus of light, labeled LF in FIG. 6, is generated. In actuality, the line focus LF will generally follow a shape of the parabolic vertical cross-section PV, as indicated in FIG. 7. However, if the parabolic cross-section is rather flat, then for practical purposes, the line focus LF can be viewed as a straight line, as in FIG. 6.

As will be described and shown later herein if the line focus LF is positioned between the reflector R and the lens L, as in FIG. 8, then a converging lens L can be used to collimate the light. If the line focus is positioned outside the lens L, as in FIG. 9, then a diverging lens L can be used to collimate the light. These features will be described later herein.

Figure 3:
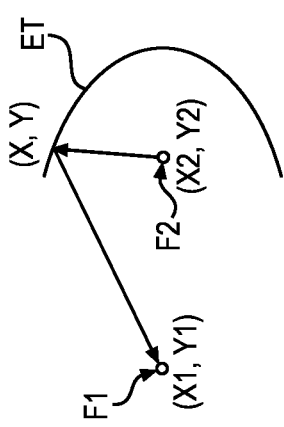
FIG. 3 illustrates a truncated ellipse ET and again showing how light originating at focus F2 will be reflected to focus F1.

The pattern of the beam produced in FIGS. 8 and 9 will depend on the geometries and relative positions of (1) the light source, (2) the reflector R, and (3) the lens L. FIG. 1 shows the vertical reference plane PV and the associated parabolic shape (FIG. 5). The cross-section in the horizontal plane PH shows the cross-section of the reflector R and its truncated ellipse ET (FIGS. 3 and 10). FIG. 10 is a plan or top view in the horizontal plane PH; and FIG. 11 is a cross-section or side view in the vertical plane PV, showing the parabolic cross-section (labeled PAR in FIG. 11).

Figure 4:
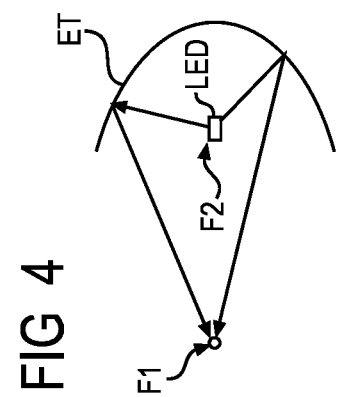
FIG. 4 shows a light source positioned at focus F2 of the truncated ellipse ET.

FIGS. 12-19 are plan views, similar to FIGS. 4 and 10. In FIGS. 12-19, X and Y axes are superimposed in the horizontal plane with an origin being located at the elliptical focus F2. In FIG. 12, a forward direction, FWD, is defined, and is the forward direction of a vehicle V (FIG. 41F) on which the lighting device 10 is mounted. An aft direction, AFT is also shown, which is the opposite of the forward direction. Left and right directions are indicated in FIG. 12 as well.

For ease of illustration, the at least one light source is shown as an LED, but it should be understood that it could be any type of light source, such as an LED, laser LED or other conventional light source. FIG. 12 shows the light source positioned at the focus F2 of the ellipse ET. However, the light source need not be positioned there. FIG. 13 shows the light source positioned forward of the focus F2, that is, in the negative X direction, and FIG. 14 shows a light source positioned aft of the focus F2, that is, in the positive X direction. FIG. 15 shows the light source positioned to the right of the focus F2, that is, in the positive Y direction. FIG. 16 shows the light source positioned to the left of the focus F2, that is, in the negative Y direction.

FIG. 17 shows a general case where the light source is displaced in both the X and Y directions, and either positively or negatively in each direction. In the example of FIG. 17, the light source is displaced in the negative X direction and in the positive Y direction.

In addition, the direction of the light projected by the light source need not coincide with the optical axis of the system, which is taken as the X-axis in this case. As FIG. 18 shows, the projected light can be off-axis from the optical axis of the reflector R, which is the X-axis, and FIG. 19 illustrates the general case. The light source can be displaced from the focus F2, and the projected light (which follows the optical axis of the light source) need not be parallel to the optical axis, namely, the X-axis.

These same principles apply to the positioning of the light source with respect to the parabolic focus FP (FIG. 5) of the parabolic cross-sections. For example, FIG. 5 shows the light source positioned at the focus FP of the parabola. However, as just stated, the light source can be positioned to the left, right, above, or below the focus FP and it can be tilted or rotated with respect to it. Thus, as explained in connection with FIGS. 18 and 19, a direction of the projected light can be adjusted, although this fact perhaps only has relevance when the light source is displaced from the focus FP of the parabola because if the light source is located at the focus FP, then all light will necessarily be reflected as parallel rays by the parabola.

The Inventors have found that the displacements of the light source from the foci just discussed and rotation of the light source will alter the beam patterns produced. Further, it has been found that certain combinations of displacements produce alterations which are very favorable in a vehicle headlight. When these features are used with the reflector R and lens L described herein, an improved light beam is generated as described herein. However, it is not practical to attempt to manually analyze a beam pattern which will be produced by a given apparatus in FIG. 1, with given displacements of the light source. A primary reason is that the reflective properties of an ellipse, when the at least one light source is not located at a focus, are extremely complex. Therefore, as a practical matter, computer modeling has been used.

Positioning of Elliptical and Parabolic Foci and the Light Source

FIG. 1 is a perspective view with the horizontal reference plane PH and the vertical reference plane PV superimposed as mentioned. FIG. 20 is a cross-sectional or plan view taken through the horizontal reference plane PH of the ellipse of FIG. 1. The light source is located in this plane. FIG. 21 is a cross-sectional side view in the plane PV of the parabola of FIG. 1.

FIG. 22 indicates that the focus FE of the ellipse of FIG. 1 is coincident with the focus FP of the parabola shown in FIG. 1 and FIG. 5. However, it is possible that those foci need not coincide and they can be offset from each other both vertically and horizontally. In some embodiments, separation of the two foci provides a favorable or desired beam pattern as described herein. FIG. 23 indicates a deviation in the Y direction, labeled DEL Y, and a deviation in the X direction, labeled DEL X. Each deviation can be positive or negative. In a preferred embodiment, the light source is deviated plus or minus only along the optical axis (X) and is generally not shifted in the Y-axis laterally. FIG. 26 indicates a deviation in the Z-direction, labeled DEL Z, which can be positive or negative. It is noted that the ellipse focus FE is that of the ellipse in the horizontal plane which contains the light source. In addition, the light source can be angled or rotated with respect to the foci FE and FP, as indicated by angle A in FIGS. 24 and 27. The light source can also be displaced from the focus FE, as indicated by DEL Y and DEL X in FIG. 27.

Now that the general features and principles of operation of the invention have been described, several embodiments will now be described. As will be seen, several lighting device modules have been developed using these principles and these modules generate different beam patterns. The modules can be used alone or together, such as in a stacked configuration shown and described later herein.

Figure 28:
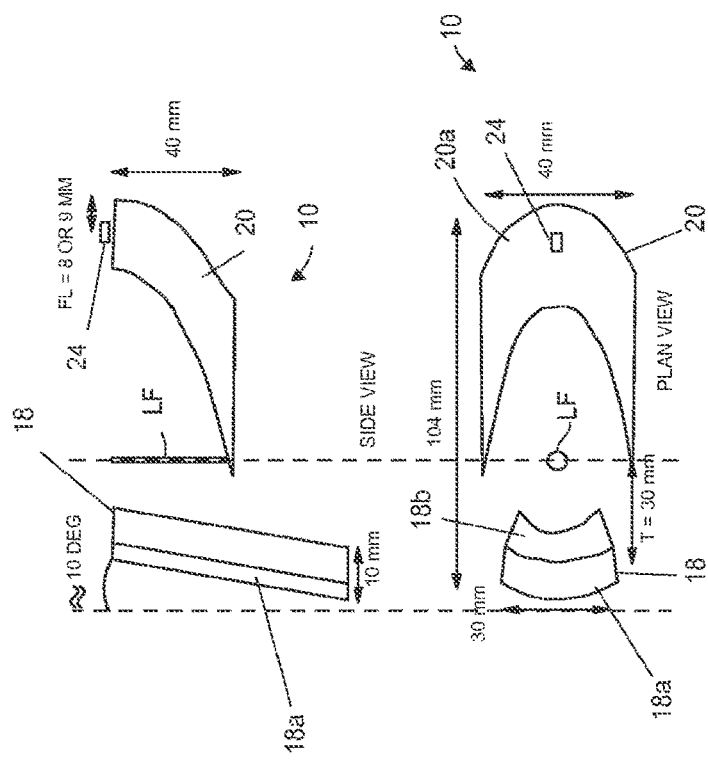
FIG. 28 is a view of a light module in accordance with one embodiment for producing a flat beam pattern.

FIGS. 28-31B illustrate several embodiments or modules 10, 12 and 14 that produce different or unique lighting patterns. In the embodiment of FIG. 28, a lighting device or module 10 provides a forward lighting automotive module that utilizes a thin aspect lens 18 for styling. For ease of understanding, the embodiments of FIGS. 28-31B are illustrated without the supporting housing, bezel or structure which will be described later herein. Thus, it should be understood that the components of the various modules illustrated in FIGS. 28-31B are mounted in or to a suitable housing, bezel or support structure and situated on a vehicle, such as the vehicle V illustrated in FIG. 41F. Also, for ease of illustration, the modules are shown in a side view and a plan view as indicated.

In the illustration being described, the module 10 in FIG. 28 generates a generally flat beam pattern shown and described later herein, and the module 12 (FIG. 29) generates a high beam pattern. The module 14 in FIGS. 30-31B generates a low beam pattern having a kink. As mentioned, these modules 10-14 can be used alone or in combination, such as in a stacked form, as shown and described later herein. The modules 10-14 are under the control of a controller (not shown) and can be energized independently or simultaneously. Thus, the modules 10-14 can be used separately or together to provide different beam patterns, such as, a high beam pattern or a low beam pattern with cut-off that conform to the light pattern designs prescribed by the Society of Automotive Engineers (SAE) in the United States and the Economic Commission for Europe (ECE).

For ease of understanding, several beam intensity plots are shown and described herein. The axes of the plots shown in the figures are calibrated in angular units with respect to the lens, but in principal, the plots indicate how the beam would appear if projected onto a flat wall. The SAE and ECE plots for the embodiments being described possess two significant features. One is that there is a rather sharp cut-off on the left and right sides. A second is that there is an intensely bright central region. The particular intensity pattern produced by the various modules and the reflector/lens combinations described herein depend on the geometries of the materials and components used and a combination of one or more of the features mentioned earlier and other factors.

Referring back to FIG. 28, the flat beam module 10 is shown. In this embodiment, the module 10 comprises a divergent lens 18 having a lens focus that is coincident with a line of focus LF. Note in the illustration, that the lens 18 is tilted off vertical (as viewed in FIG. 28) approximately ten degrees (10.degree.), but the tilt could be greater or less depending on the beam pattern desired. Preferably, the tilt is less than twenty degrees (20.degree.).

In the embodiment of FIG. 28, the module 10 also comprises a reflector 20 which is elliptical in cross-section in the horizontal plane PH described earlier herein relative to FIG. 1 and parabolic in the vertical plane PV described earlier. In the illustration being described, the reflector 20 has a smooth reflective surface 20a in one embodiment, but it could be faceted as described later herein. The lens 18 is shown as being smooth on a first side 18a and on a second side 18b. However, the second side 18b could have one or more modulations or other optics to, for example, increase a spread of the light beam and/or protect its homogeneity. In this example, the first side 18a is continuous and smooth which makes it advantageous when mounted on the vehicle V because it can match a contour C and a surface S (FIG. 41F) of the vehicle V, thereby presenting various styling options.

As alluded to earlier, the reflector 20 has an interior surface 20a that is reflective. The reflector 20 can me made conventionally using a thermoset or thermoplastic material that can be metalized with a reflective coating and the like. One feature of the illustrations being described is that the reflectors, such as the reflector 20 in the embodiment of FIG. 28, whether they are faceted or not, have an elliptical cross-section in the horizontal plane PH and parabolic in the vertical plane PV that collect source light and direct it to produce a line focus LF.

In the embodiment of FIG. 28, the reflector 20 has a focal length of the parabola of approximately 8-9 mm. A light source 24 is situated substantially at the parabolic and elliptical focus and cooperates with the reflector 20 to generate a line focus LF at approximately 33 mm in front of the second surface 18b of the lens 18. Note that the reflector 20 is approximately 40 mm wide while the lens 18b is approximately 30 mm wide. Thus, the reflector 20 is wider than the lens 18 by a ratio greater than or equal to 1. Note also that the reflector 20 has a height of approximately 40 mm, and the height of the lens 18 is greater than that of the reflector 20, and the ratio of lens 18 length to reflector 20 length is greater than or equal to 1. In one embodiment, the ratio of the reflector 20 width to the lens 18 width is greater than 40 mm/10 mm.

It is important to note that the reflector 20 and light source 24 generate the line focus LF that is between the lens 18 and reflector 20. The divergent lens 18 receives and collimates the light to generate a generally flat beam plot and associated image shown in FIG. 28A.

FIG. 28B illustrates another embodiment showing the lens 18 generally curved or arcuate along its longitudinal length which illustrates that the side 18a of the lens 18 may be styled to match, for example, the styling or body shape of the vehicle V. Note that the cut-off can be made flat with the tipped lens 18. Note that the lens 18 is tipped or inclined in the side view illustrated and curved in the plan view. In one embodiment, the lens 18 is tipped or inclined at an angle of less than twenty degrees (20.degree.).

As mentioned, the flat module 10 in FIG. 28 produces an intensity profile plot (FIG. 28A) that is wide and flat as shown by the plot and picture in FIG. 28A. It is flat in the sense that a single intensity of medial value is spread out through nearly all the beam. It is wide in the sense that it spans thirty to forty degrees (30.degree.-40.degree.) both left and right, which is approximately sixty to eighty degrees (60.degree.-80.degree.) total span in the illustration being described. The intensity profile plot for the alternative embodiment of FIG. 28B is shown in FIG. 28C. Note that the flat intensity profiles indicate a wide beam that is generally lacking in a central region of high intensity when compared to other embodiments described herein. The pattern of FIG. 28A shows a spread of plus or minus 35 degrees with about 57% efficiency of light output to light input from the light source 24. The beam shows a flatter cut-off, redistribution of light from a center of the pattern and an increase in vertical spread of about 1-2 degrees.

Figure 29:
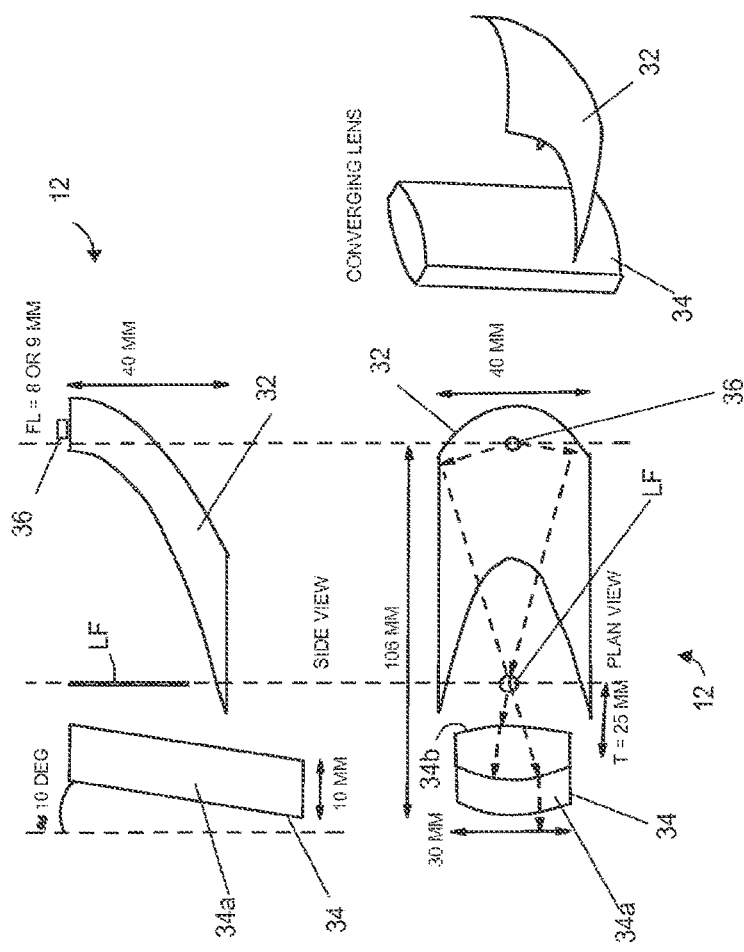
FIG. 29 is a view of a module in accordance with another embodiment for producing a high beam pattern.

Referring now to FIG. 29, another embodiment of the invention is shown illustrating the module 12 for generating a high beam. This embodiment also comprises a reflector 32, which may be smooth or faceted as described later herein, a lens 34 and at least one light source 36. Again, the at least one light source can be any suitable source, such as one or more conventional LEDs or laser LEDs. Unlike the embodiment described relative to FIG. 28, note that this embodiment comprises a convergent lens having a width of approximately 33 mm as shown and a depth of approximately 10 mm. Like the embodiment shown in FIG. 28 for the flat module 10, note that the lens 34 is tilted or inclined off vertical approximately ten degrees (10.degree.) as shown. In the illustration being described, the reflector 32 generates a line focus LF between the lens 34 and reflector 32 that is approximately 25 mm in front of the surface 34b. As with the embodiment of FIG. 28, the surface 34a of the lens 34 may be curved along its longitudinal length and in cross-section as shown in order to generally conform to the contour or shape of the contour C (FIG. 41F) of the surface S of the vehicle V.

It should be understood that like the embodiment described relative to FIG. 28, note that the lens 34 is a converging lens that is tall and narrow and not as wide as the reflector 32. Its aspect ratio is greater than or equal to 1. This is further illustrated in the bottom right portion of FIG. 29. The lens 34, therefore, has a length that is greater than a length of the reflector 32 as shown. In the illustration being described, the lens 34 is approximately 30-40 mm longer than the longitudinal length of the reflector 32 which is on the order of about 40 mm in length. It should be understood that like the prior embodiment, the reflector 32 is elliptical in the horizontal cross-section or plane PH and parabolic in the vertical cross-section or plane PV.

The associated high beam intensity plot for module 14 is illustrated in FIG. 29A and shows a narrowed and more intense beam compared with the other light intensity plots described herein. Note the central region of generally high intensity, as shown in FIG. 29A.

FIG. 30 illustrates still another embodiment showing the module 14 for generating a beam pattern that comprises a kink or elbow as required by the ECE. In this embodiment, the module 14 comprises a lens 42, a reflector 44 and at least one light source, which is again is shown as an LED for ease of understanding. In this embodiment, the light source 42 is divergent and is tilted off vertical toward the reflector 44. The lens 42 has a length of approximately 50 mm, while a length of the reflector 44 is less, so that the aspect ratio of lens 42 height to reflector 44 height is greater than or equal to 1. The ratio of reflector 44 width to lens 42 width is greater than or equal to 1. The lens length or height is greater than or equal to the reflector height. It has been found that the 80 mm height is only for styling. The fact that the lens 42 has an extruded cross-section allows the height to be taller than a normal imaging lens. In the illustration, the reflector 44 has a parabolic focus of approximately 13-15 mm at which the light source 46 is situated as shown. It is important to note that the line focus LF is not between the lens 42 and the reflector 44, but rather, is in front of the front surface 42a of the lens 42 as shown. In the illustration being described, the line focus LF is approximately 30 mm in front of the surface 42a of the lens 42. Note that the light source 46 is situated approximately 90 mm from the surface 42a of the lens 42. In an alternate embodiment described later herein relative to FIGS. 31A-31B, note that this distance could be between 110-140 mm. Note that the light source 46 is rotated 15 degrees in the side view. A distance between a rear surface 44a and the surface 42a is on the order of about 108 mm, and in the alternate embodiment, between 90-120 mm. In the alternate embodiment, the overall length of the reflector 44 may be between 30-60 mm. As with the other embodiments, note that the reflector 44 is elliptical in the horizontal plane PH and parabolic in the vertical plane PV as mentioned earlier.

It should be understood that the dimensions and relative relationships mentioned for all embodiments may change depending on the size of the reflector 44.

FIG. 30A illustrates the intensity profile plot and associated picture for the module 14.

FIGS. 32A-32D illustrate another embodiment of the module 14 wherein the reflector 44 comprises a surface 44a having a plurality of facets 44c. As mentioned earlier, the reflectors 20, 32 and 44 could also have one or more facets 44c. The features of various facets 44c will be described later herein, but it should be understood that the facets 44c generally conform to the elliptical and parabolic shape of the reflector 44. As explained later, the facet shape, position and dimension may be changed or altered to optimize the beam pattern, such as providing a pattern having an elbow or kink (labeled 44g in FIG. 33A), which is conventionally referred to as an ECE kink.

Figure 33A:
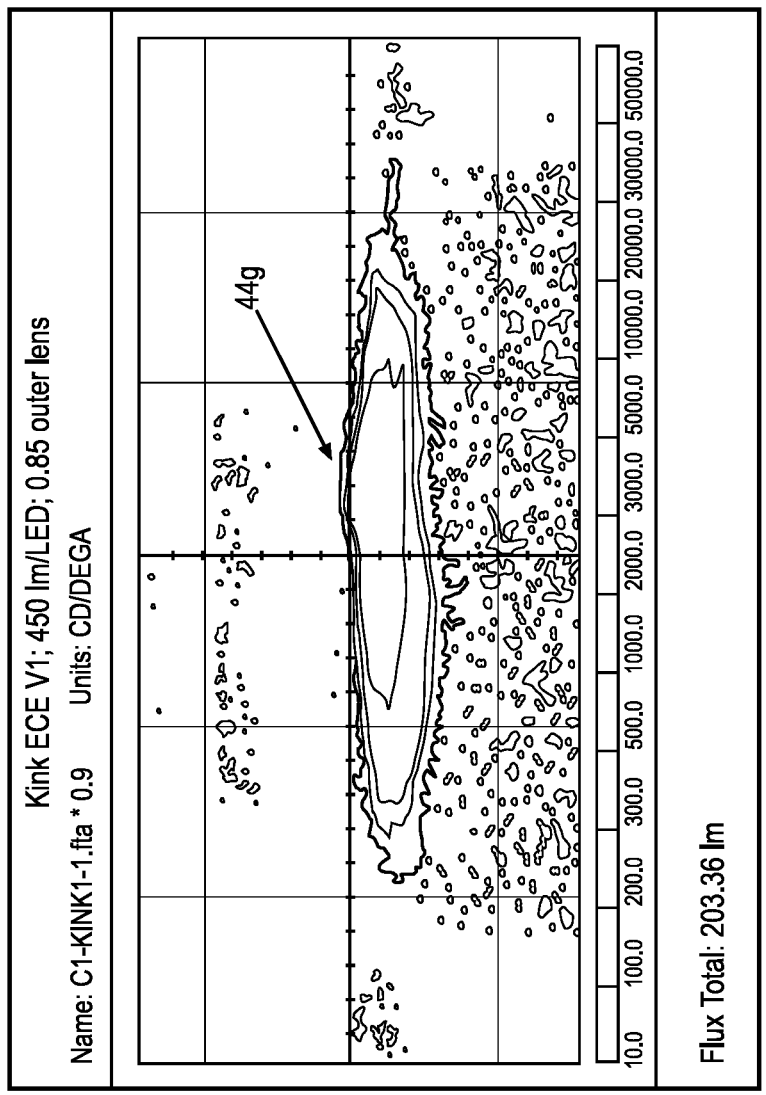

In the illustration being described, the reflector 44 (FIG. 32C) comprises twelve regions of facets, with each region comprising nine individual facets 44c. The light images produced by the facets 44c cooperate to generate the light pattern as described in more detail later. In this embodiment, the facets 44c of regions 44d-44f are modified to provide the kink or elbow 44g illustrated in the light intensity associated with the embodiment of FIG. 32C which is illustrated in FIG. 33A. It should be understood, therefore, that one feature of the invention is that the facets 44c that make up one or more regions 44d-44f of the reflector 44 may be modified to optimize the beam pattern to have a desired shape or to provide specific features such as a kink or elbow in the pattern. As illustrated in FIGS. 32D-32F, all or portions of the facet 44c can be aimed or deviated from the optical axis up or down and laterally (Y) to position the light. This allows the facet 44c to become "defocused" and the orientation of the at least one light source will provide the desired kink or elbow in the pattern.

For example, with a parabolic reflector, light at a focus of the parabola will be collimated and reflected to infinity generally parallel to the optical axis. With "defocused" light, such as by moving the at least one light source relative to the focus, light rays go to another focus in space either up, down or sideways relative to the optical axis of the reflector. Thus, by defocusing, the image from the at least one light source can be directed to provide a portion of the overall light beam pattern. In the illustration being described, the at least one light source is defocused to provide the kink or elbow described herein. As explained later herein, a manipulation of one or more portions of the reflector can also facilitate providing unique characteristics to the beam pattern, such as the kink or elbow just mentioned.

FIG. 32D shows the facet 44c aimed or deviated. FIG. 32E shows a portion of the facet 44c aimed or deviated. FIG. 32F shows a portion of the facet 44c truncated or repositioned.

The inventors have found that another way to modify the light beam intensity profile and to improve the formation of kink steps, such as the kink 44g shown in the plot of FIG. 33A, is to rotate the light source 46 or change its position in a manner described earlier herein. For example, the light source 46 could be rotated vertically (FIG. 31A) and/or horizontally or in the horizontal plane PH (FIG. 31B). Thus, in this embodiment of FIG. 31A, the module 14 is shown as having the light source 46 angled downward by an angle of approximately five to fifteen degrees (5.degree.-15.degree.) as shown in FIG. 31A. The angle .beta. is measured between the flat base of the light source 46 and the horizontal as indicated in FIG. 31A. When the five to fifteen degrees (5.degree.-15.degree.) deviation or pivot is imposed, then the optical axis of the light source 46 will also be rotated toward the reflector 44 the same number of degrees, namely five to fifteen degrees (5.degree.-15.degree.), respectively, in this example. In the illustration being described, this rotation increases the collection of light by portions of the reflector 44, such as the facets 44c in the regions 44d-44f of the reflector 44.

Note in the embodiment of FIG. 31B, the light source 46 is rotated in the horizontal plane PH as shown. In this illustration, the light source 46 is rotated approximately five to twenty degrees (5.degree.-20.degree.). It has been found that rotating or pivoting the light source 46 in the manner shown in FIGS. 31A and 31B improves the cut-off of the light beam or an abrupt drop in the light intensity at the edge of the beam as illustrated in FIG. 30A.

As mentioned earlier, it should be understood that the dimensions are illustrative, and other dimensions may be used, which will depend on the environment the lighting device is used.

In the embodiment of FIGS. 30-31B, the line focus LF is positioned forward of the lens 42 and is not between the reflector 44 and the lens 42.

Further, the alternate side view indicates that the optical axis of the light source 46 is angled downward at an angle .beta. by 5 to 15 degrees, as indicated. The angle .beta. is measured between the flat base of the light source and the vertical as indicated in FIG. 31A. When the 5 to 15 degree deviation is imposed, then the optical axis will be rotated toward the reflector 44 by that same 5 to 15 degrees. This rotation increases collection of light in desired areas of the reflector 44.

Further still, the alternate plan view (shown in the bottom portion of FIG. 31B) indicates that the optical axis of the light source 46 is rotated away from the optical axis of the reflector R by 5 to 20 degrees. It has been found that this improves the cut-off of the beam. It should be noted that a cut-off in the light pattern is an abrupt drop-off in brightness at the edge of the beam as illustrated.

Figure 33B:
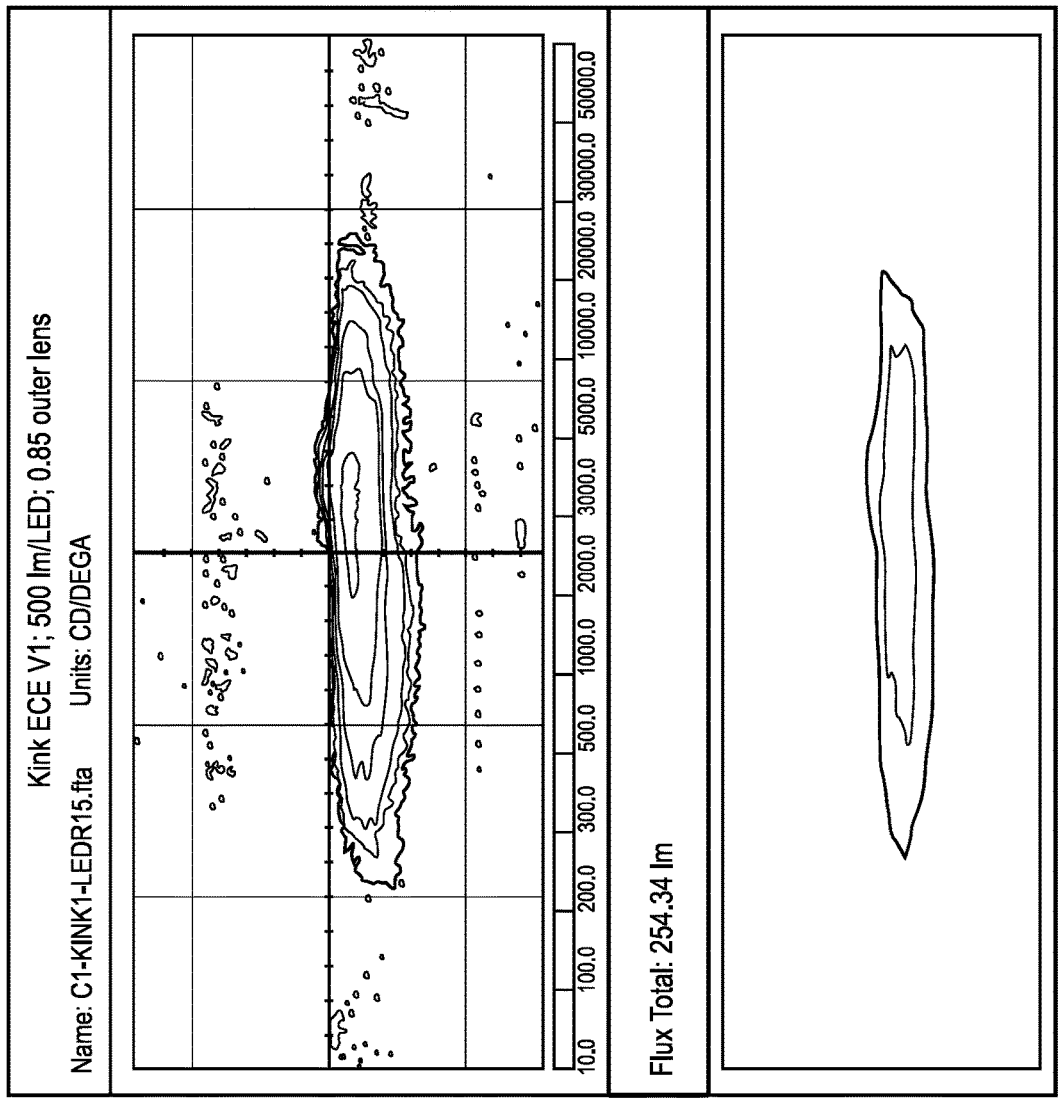

FIG. 33A illustrates the light intensity when the light source 46 is rotated approximately fifteen degrees (15.degree.) in the horizontal plane PH illustrated in FIG. 31B. FIG. 33C shows the same embodiment of FIGS. 30-31B with the light source 46 rotated downward only slightly (approximately one degree) (1.degree.). FIG. 33B illustrates the light source 46 rotated both in the vertical plane PV and horizontal plane PH shown in FIGS. 31A and 31B, respectively. In the illustration of FIGS. 33A and 33C, the light source 46 was a 450 lumen source.

The following Table I summarizes various characteristics or dimensions for these illustrative embodiments:

TABLE-US-00001 TABLE I Flat Model High Beam Kink SAE Kink 2 ECE (FIG. 28) (FIG. 29) (FIG. 30) (FIG. 31A-31B) Reflector Height (H) 40 mm 40 mm<50 mm or 30-60 mm<50 mm or 30-60 mm Width (W) 40 mm 40 mm 50 mm or 40-60 mm 50 mm or 40-60 mm Lens Divergent Convergent Divergent Height (H)>40 mm>40 mm 50 mm or 30-80 mm 50 mm or 30-80 mm Width (W) 30 mm 30 mm Depth (D) 10 mm 10 mm 10 mm 10 mm Focal Distance 8-9 mm 8-9 mm 13-15 mm 13-15 mm Lens Tilt .apprxeq.10.degree. .apprxeq.10.degree. .apprxeq.10.degree. .apprxeq.10.degree. Light source None 15.degree. vertically or 5-15.degree. 5-15.degree. in horizontal Rotation in vertical and/or plane PH and 5-20.degree. in horizontal plane vertical plane PV FIG. 33B shows the intensity plot for the embodiment of FIGS. 30-31B where a 500 lumen light source 46 was rotated approximately fifteen degrees (15.degree.) in both the horizontal plane PH and the vertical plane PV. This embodiment is particularly adapted to create a headlamp device that generates a beam pattern that complies with SAE standards. In this embodiment, the light source 46 is rotated fifteen degrees (15.degree.) in the vertical plane PV. The light intensity plot is shown in FIG. 35. Note the difference in the intensity plots of FIG. 33A, where the light source 46 was rotated in the horizontal plane PH approximately fifteen degrees (15.degree.), which generated the kink. In comparison, the light source 46 was not rotated in the horizontal plane PH in the SAE embodiment of FIG. 34, but was rotated in the vertical plane PV, which generated a distinct cut-off, but not the ECE kink. This pattern conforms to SAE standards.

Figure 34:
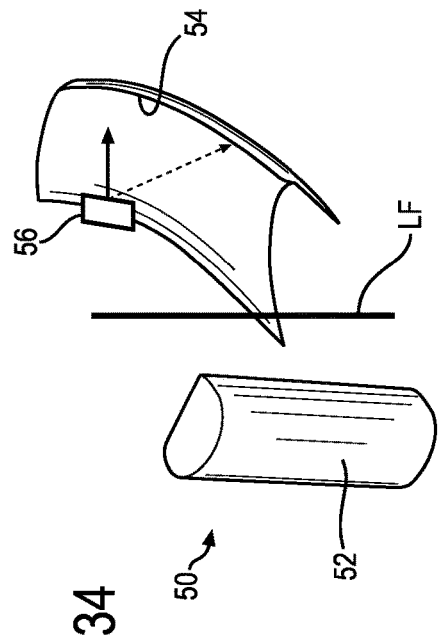
FIG. 34 illustrates another embodiment utilizing a converging lens and wherein a focused line is between the converging lens and the reflector.
Figure 35:
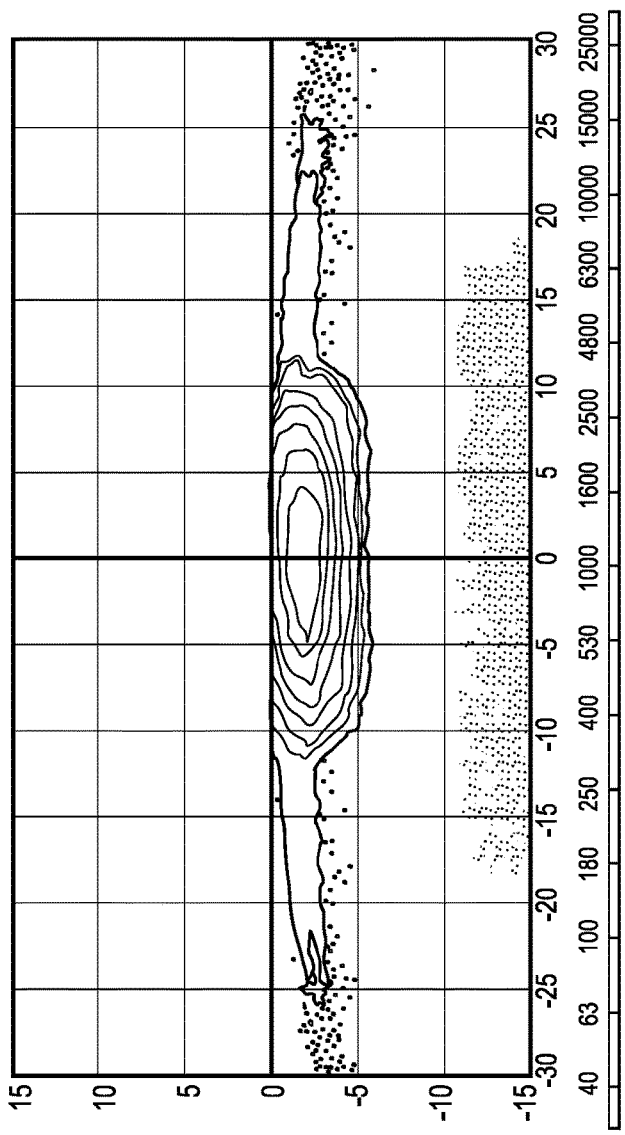
FIG. 35 is an intensity plot diagram for the embodiment shown in FIG. 34.
Figure 37A:
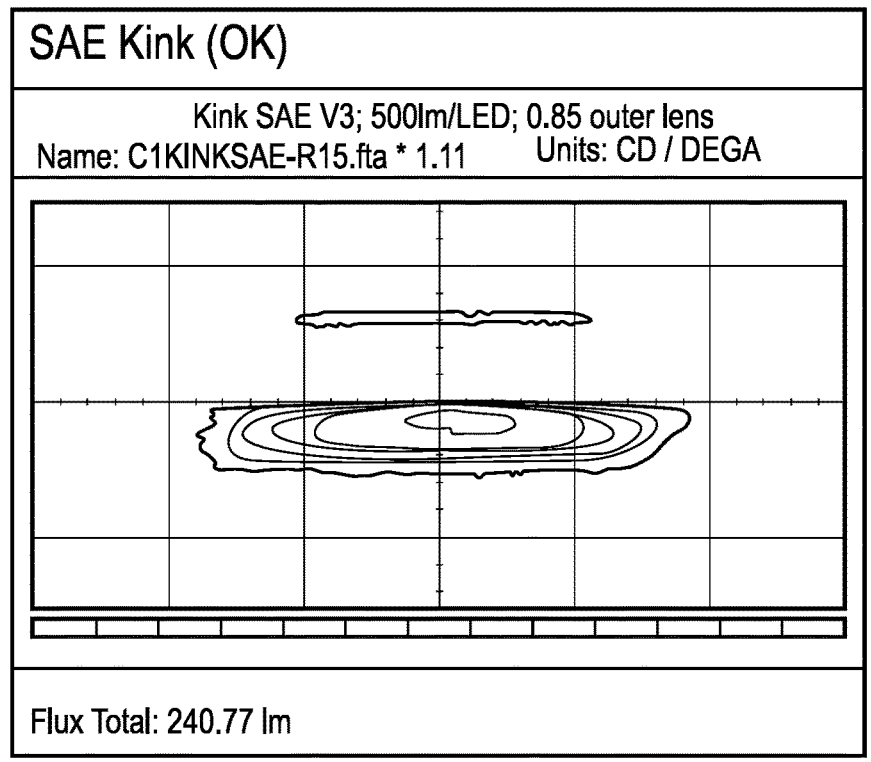
FIG. 37A-37D are views illustrating various light beam intensity patterns.
Figure 37B:
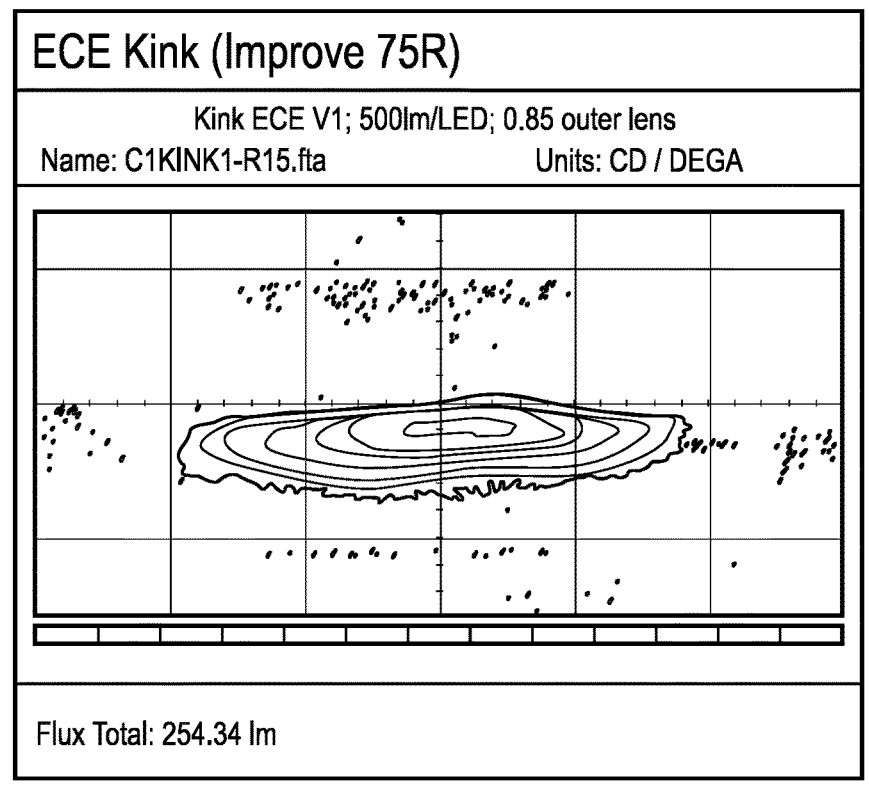
Figure 37C:
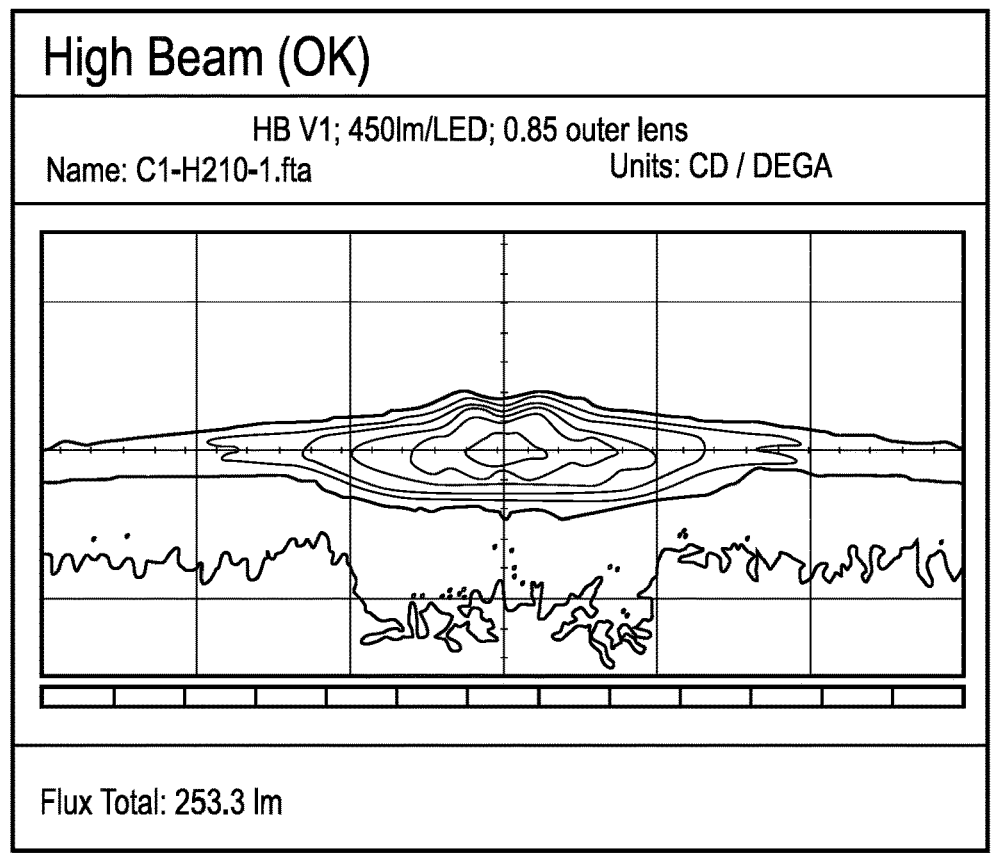
Figure 37D:
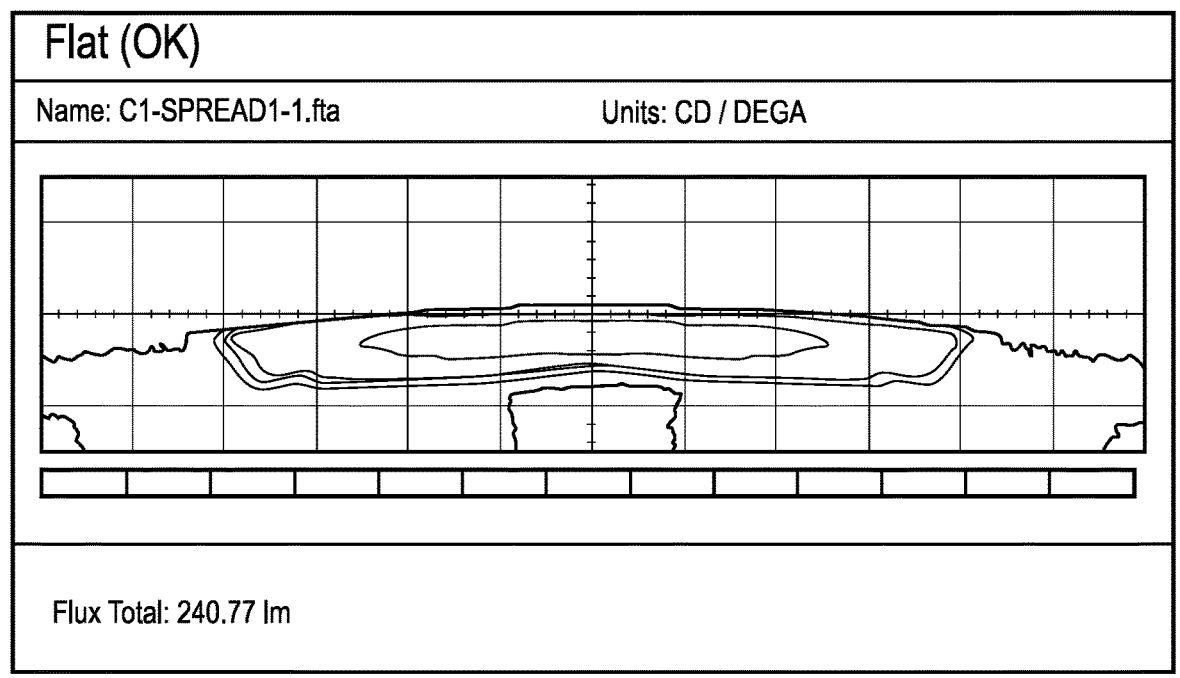

FIGS. 34 and 35 illustrate another embodiment of showing the module 50 that generates an SAE conforming pattern. In this embodiment, the module 50 comprises a converging lens 52, reflector 54 and light source 56 that generates the line focus LF between the lens 52 and reflector 54 as shown. The resultant isolux pattern is shown in FIG. 35 having a favorable cut-off and no kink. In this embodiment, the light source 56 was rotated in the vertical plane PV approximately fifteen degrees (15.degree.).

A test device 51 for the module 14 is shown in FIG. 36. The device 51 has a housing 53 that receives and supports the reflector 44 and the lens 42. A top support 53a of the housing 53 receives and supports the light source 46. This embodiment generates the patterns mentioned earlier relative to FIGS. 33A-33C, for example.

The embodiments shown and described relative to FIGS. 29-34 illustrate various modules for generating a high beam, flat beam, SAE kink and a low beam as well. For ease of comparison, the high beam, flat beam, SAE kink beam and ECE kink beam are shown in FIGS. 37A-37D.

Advantageously, the inventors have found that a wide variation of thin aspect beam patterns can be generated using the embodiments described herein. A common characteristic of each embodiment is that the reflector is elliptical in the horizontal plane PH and parabolic in the vertical plane PV. The various facets of the reflectors, such as reflector 44, can be adapted or modified to enhance the aspects of the various light beam patterns, such as enhancing the cut-off, kink or elbow. The inventors have also found that by manipulating the position of the light source and/or using different combinations of a divergent or convergent lens with the reflector can produce preferred results. The control of the dimensions of the reflector and the light source position also facilitates eliminating the need to use a folder or traditional imaging lens.

The lens width dimension for each embodiment provides a thin aspect of the width relative to the length which can be very advantageous for styling purposes when the lighting device is mounted on the vehicle V. While the various lenses may be contoured and may have microstructure to improve diffusion of light, the necessity for such features is reduced or eliminated. Note that this occurs in one integrated optical system or device which can use a single lens or multiple lenses. Again, the lenses of the embodiments being described can be made taller than traditional imaging lenses without creating a thick, molded part. The shape of the lenses also allows the light source and reflector parts to be rotated independently from the lens, allowing cut-offs and kinks to be achieved while using a fixed lens. Again, the optical system allows the outer side of the lens to be defined by the contour C (FIG. 41F) and styling of the vehicle V, thereby allowing consistency in appearance between different lenses or multiple reflectors behind the single lens.

The reflector and the inside surface of the lens may be manipulated or designed to control the light beam pattern, as opposed to changing the shape or characteristics of the lens itself. The shape of the lens allows the lens to be integrated as an external lens, such as beside, adjacent to or integral with the surface of the vehicle, which allows for reduced parts and costs and provides for unique styling opportunities.

While each of the embodiments have been shown using a single light source or monochip, it should be appreciated that the at least one light source could comprise multiple chips or multiple light sources, such as conventional LED or laser LED or other types of light sources. The modules 10, 12 and 14 shown in FIGS. 28-31B are adapted and capable of being used alone or together such as in a stacked composite arrangement of the type shown in FIGS. 38A-38D to provide a headlamp assembly 60. In general, FIGS. 38A-38D illustrate the headlamp assembly 60 comprising a lens 62 and a plurality of reflectors 64 that are mounted to a bezel 68. Note that a light source 66 is associated with each of the reflectors 64. The bezel 68 has a bottom member 70 and a top member 72. The bezel 68 further comprises a back wall or member 74 having a plurality of step surfaces 74a-74e. The reflectors 64 are mounted on the stepped surfaces 74a-74e between the bottom member 70 and top member 72 and conventionally fixed or secured to the step surfaces 74a-74e. Note that in the illustration being described, the bezel 68 does not have any side walls so that the ends, such as end 64a and 64b of reflectors 64 may extend through the open sides 68a and 68b, respectively, of the bezel 68, as illustrated in FIGS. 38B and 38C. Note how the reflectors 64 are generally wider than the lens 62 which has a relatively thinner width, thereby facilitating providing and defining the thin aspect of the headlamp assembly 60. It should also be noted that a single lens 62 can be used with multiple reflectors.

Advantageously, the modules 10-14 may comprise a single type of module, such as the flat beam, high beam or kink beam modules 10, 12 and 14 shown in FIGS. 28-31B.

Alternatively, different modules may be combined or assembled together to provide a headlamp assembly 60 having a desired beam pattern. For example, in FIG. 39A, an embodiment is shown utilizing a plurality of the modules. For ease of illustration, the embodiment is shown schematically with the reflectors 20, 44 and 64 being integral with a support 88 which would either be part of or mounted to a bezel (not shown). In this illustrative embodiment of FIG. 39A, three flat modules 10 are combined with a kink module 14 to provide a low beam headlamp assembly. Advantageously, a single divergent lens 62 is used with all reflectors that has an associated light source 24 or 46 as shown. Just as with the description of the modules earlier, it should be understood that the reflectors are parabolic in the vertical plane PV and elliptical in the horizontal plane PH. It should be understood that the modules 10, 12 and 14 are independently actuable and energizable to provide one or more desired beam patterns. FIG. 39C illustrates a light intensity plot for the embodiment of FIG. 39A. The embodiment of FIG. 39A produces a composite low beam SAE headlamp assembly 60.

Figure 39B:
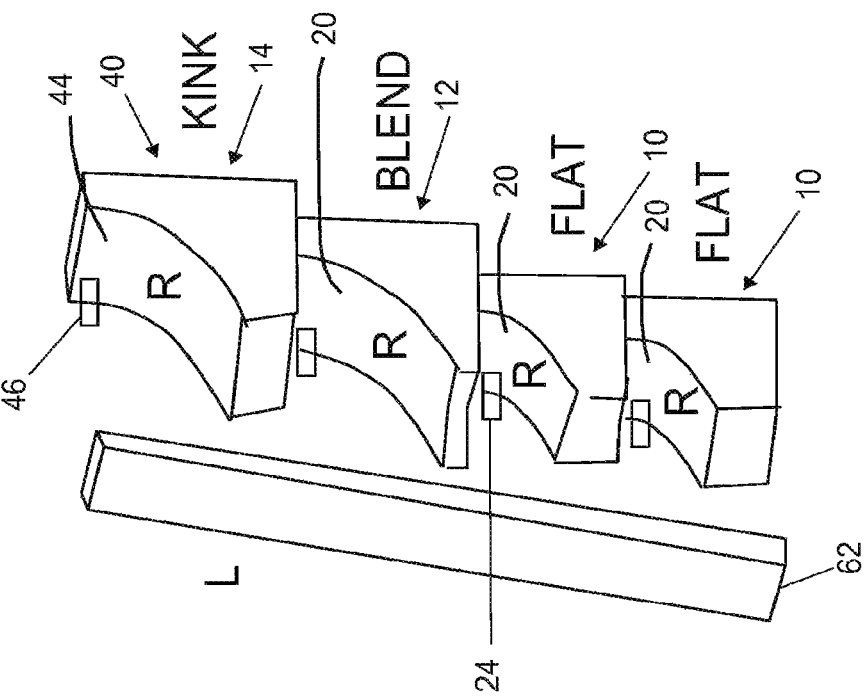
Figure 39A:
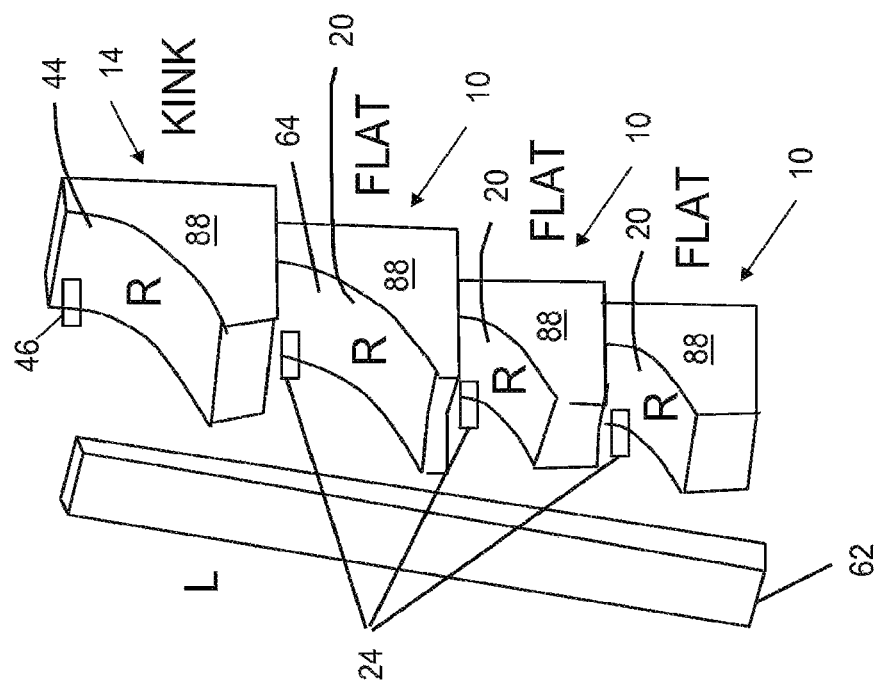
Figure 39C:
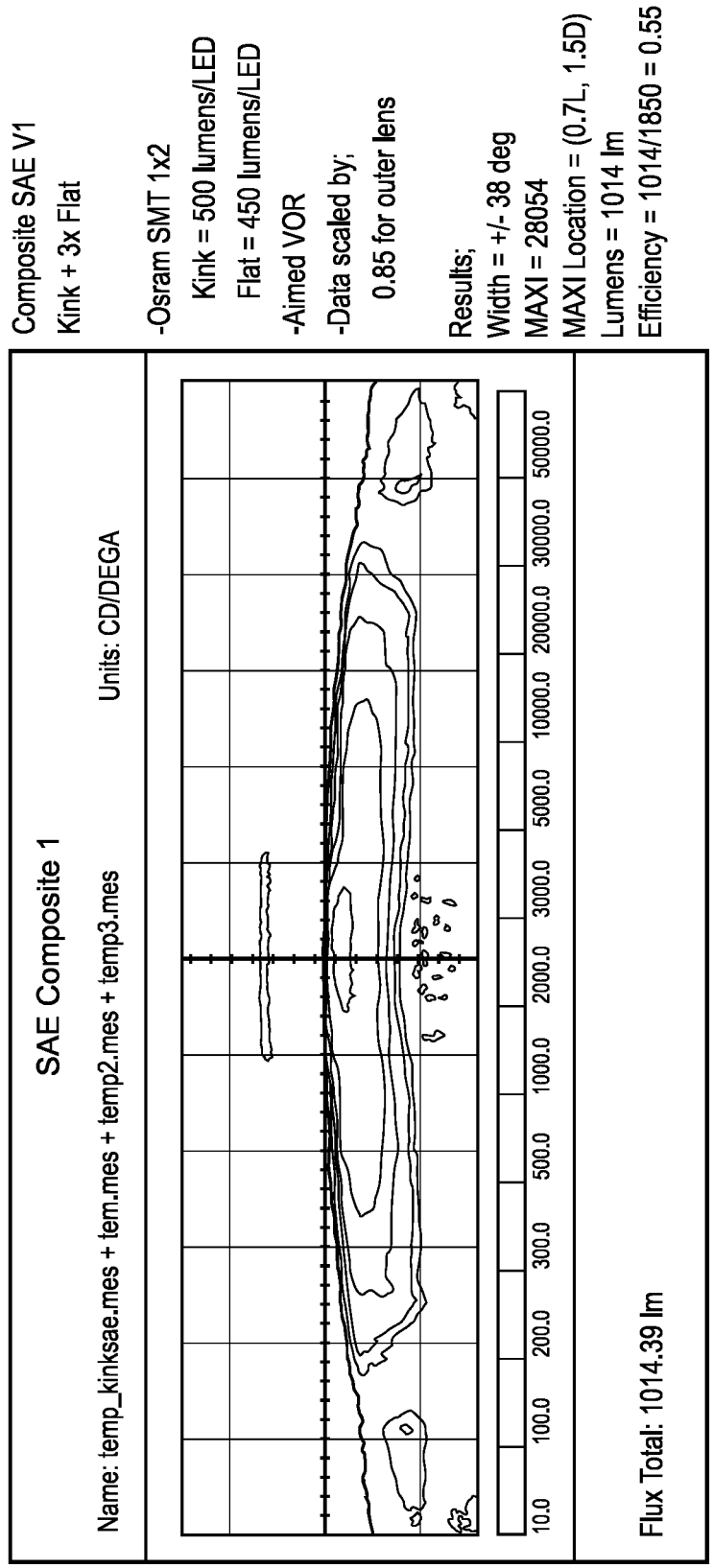

FIG. 39B shows another embodiment showing two flat modules 10, a high beam module 12 and a kink module 14 with the single divergent lens 62 in a stacked arrangement. In this embodiment, the kink module 14 utilizes a 500 lumen light source 46, whereas the flat modules 10 utilize a 450 lumen light source. The light intensity diagram for this embodiment is illustrated in FIG. 39C.

It should be understood that the various light sources 46 are under the control of the controller (not shown) that independently and/or simultaneously energizes the various modules 10-14 to create the desired light pattern.

Figure 39E:
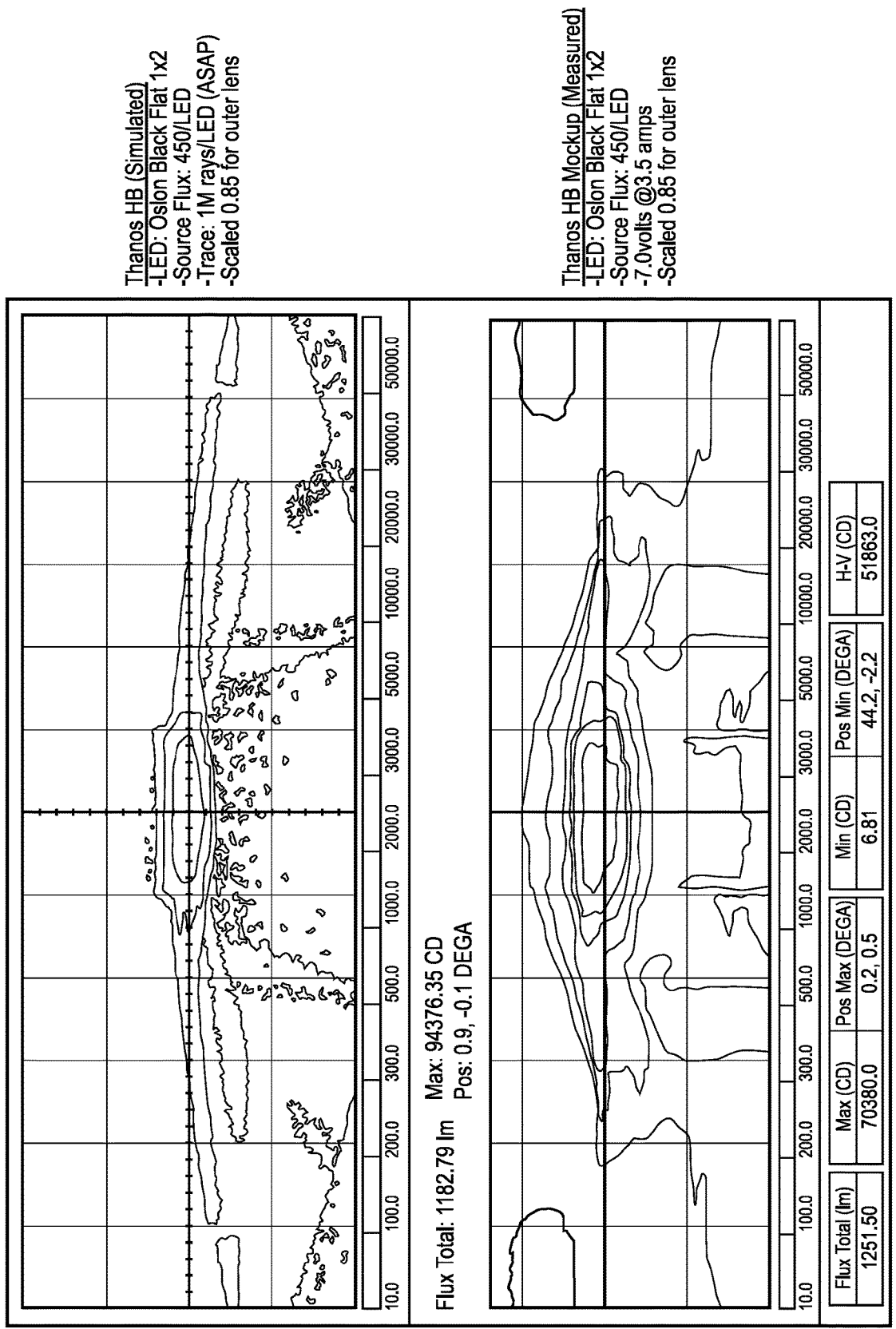

FIG. 39E illustrates a comparison of a high beam simulation of the thin aspect headlamp shown in FIG. 39B. The bottom isolux plot shows a mock up using a 450 lumen light source. FIG. 39E shows the simulated and measured isolux plots for the composite low beam module 60 utilizing a simulated headlamp assembly and an actual mockup of the type described earlier.

Figure 40:
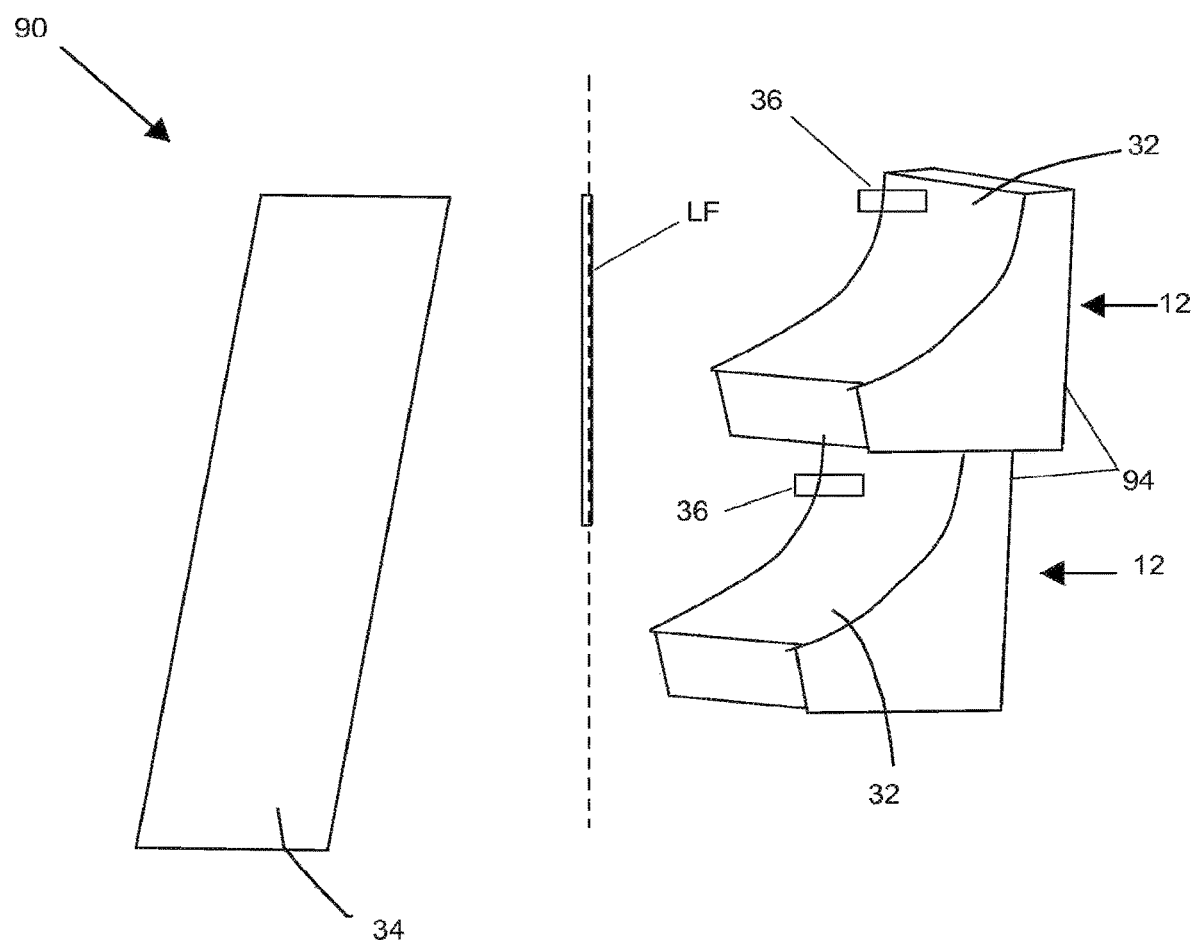
FIG. 40 is a schematic diagram illustrating two high beam modules in a stacked configuration but without any housing or bezel assembly for ease of illustration.

FIG. 40 is a schematic illustration of a composite high beam module comprising a combination of two stacked high beam modules 12. In the illustration, both modules can be independently energized. Thus, in FIG. 40, the composite high beam headlamp 90 is shown having a lens 34, a plurality of reflectors 32 and light sources 36, which are 450 lumen LEDs in the example. The modules 14 function and operate in the same manner as the modules described earlier herein relative to FIG. 29. The associated light intensity plot for the composite high beam module 90 is shown in FIG. 41.

Additional Features and Considerations

Figure 41A:
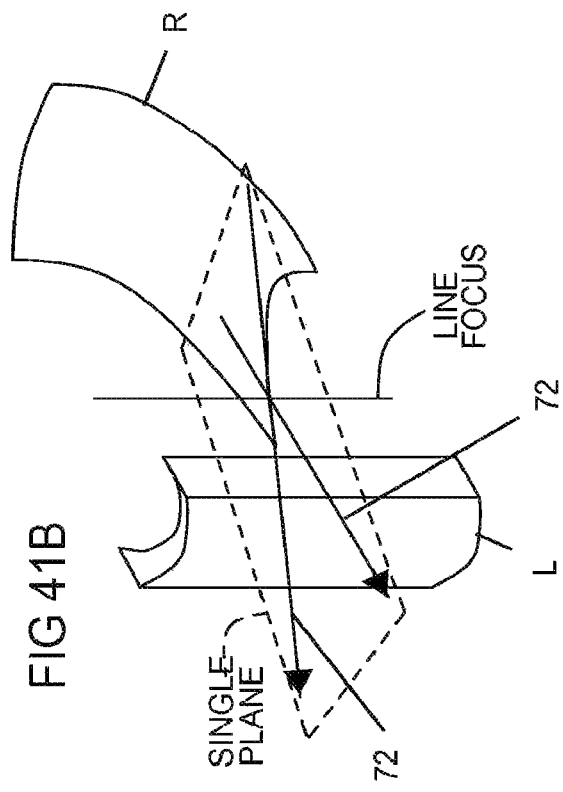
FIGS. 41A-41G illustrate how the lens L can be shaped to present an external contour which is conformal with the external surface of a vehicle.
Figure 41B:
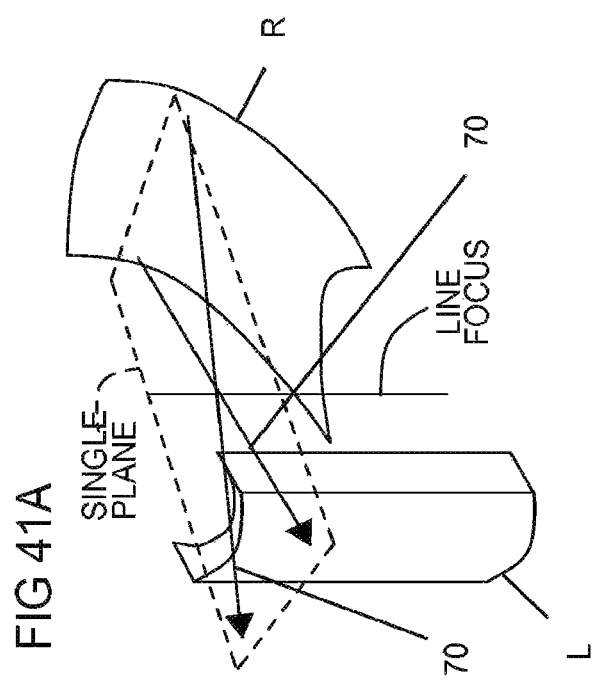
Figure 41C:
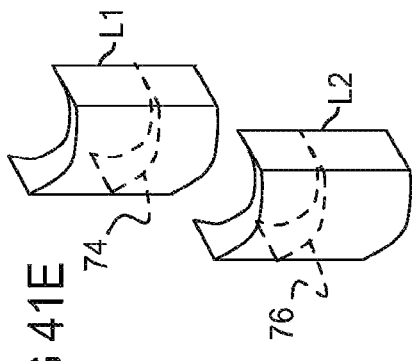
Figure 41D:
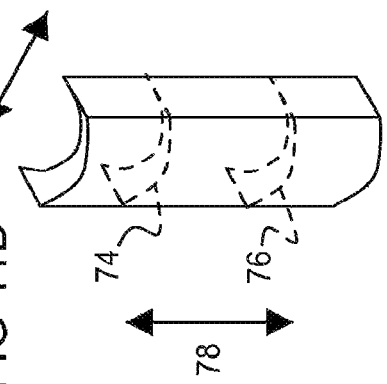
Figure 41E:
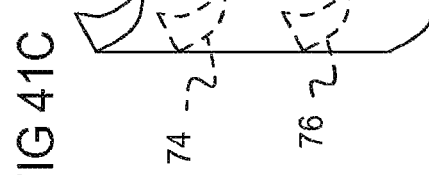
Figure 41G:
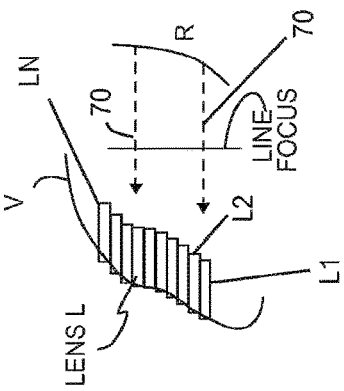
Figure 41F:
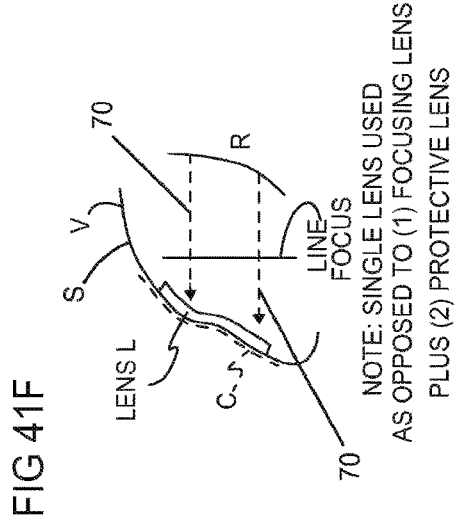

1. FIG. 41F shows a reflector R reflecting rays 70 which form a sheet of light in a single plane. FIG. 41B shows a similar sheet of rays 72, but at a different position. FIGS. 41C and 41D indicate the sub-planes 74 and 76 within the lens L. FIG. 41E indicates how the lens L can be divided into two sections L1 and L2. This concept is applied in FIGS. 41F and 41G.

FIG. 41F indicates the contour C of the surface S of the vehicle V. Lens L is designed to be conformal with the body. In FIG. 41G, the lens L is divided into blocks L1, L2 . . . LN, which are arranged to provide the contour C of FIG. 41F. In effect, a large number of very thin layers L1, L2 in FIG. 41E are stacked as in FIG. 41G to form the desired external shape of the lens L. As mentioned earlier, the lens could be a one-piece, integral construction used for all modules 10-14, or alternately separate lenses may be stacked as shown.

Figure 42:
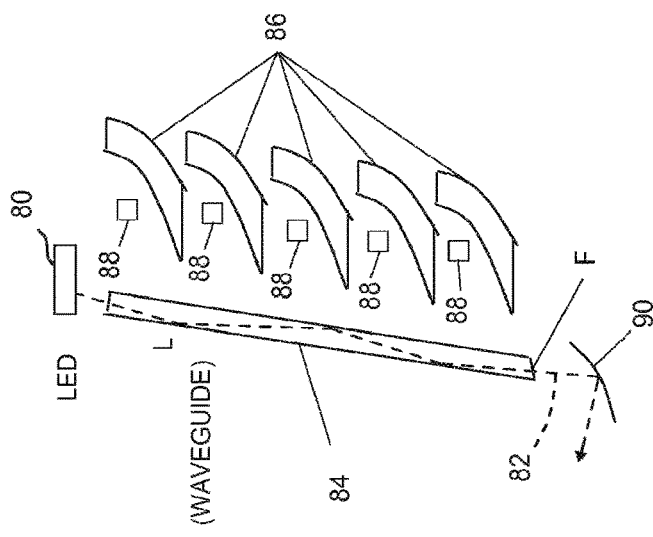
FIG. 42 illustrates how the lens L can also act as a waveguide to carry an additional light beam.

2. FIG. 42 illustrates another embodiment in which a light source 80 launches an additional light beam 82 into the lens 84, in addition to the main beam or beams (not shown) from light sources 88 reflected to the lens 84 by the reflectors 86. One or more of these modules 10-14 could be used in this embodiment. The beam 82 is reflected by reflector 90 to perform a secondary function, such as a DRL, side light or signaling function, as when the beam 82 acts as a turn signal. In this embodiment, the beam 82 is generally transverse to the main beam reflected by reflectors 86. Alternately, the end of the lens 84 can be equipped with optics, such as frosting F, to diffract the beam 82, to provide a glowing region at the location of the frosting. The inventors point out that the lens 84 in this situation performs a dual function: it focuses light received from reflectors 86 to provide a main beam or a beam that performs a first function and it acts as a waveguide for light received from the light source 80 to provide a second beam that performs a second function.

Figure 44:
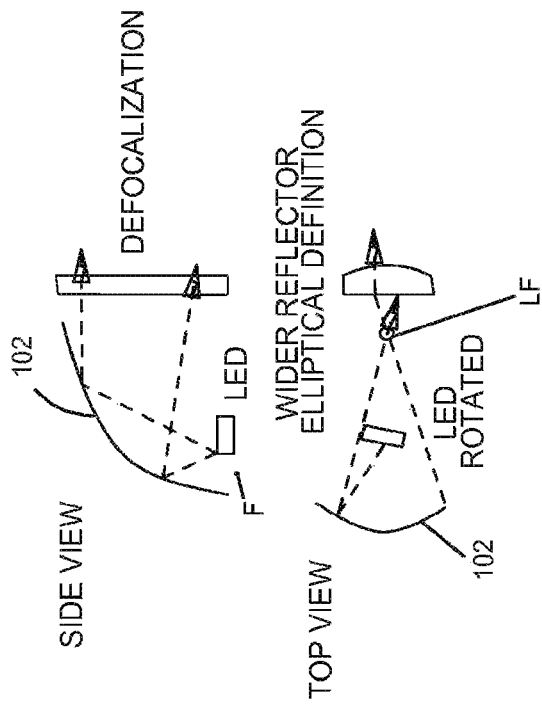
Figure 43:
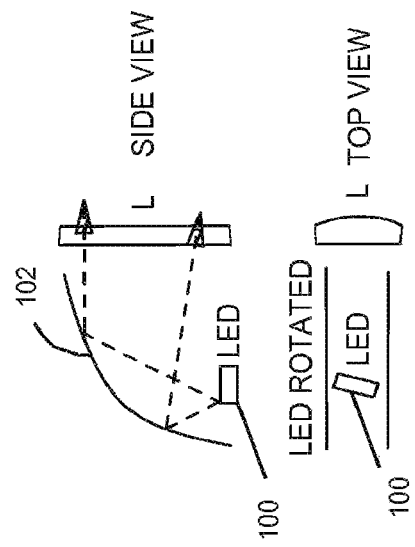

3. In some instances, it may be desired to defocus the beam. FIGS. 43 and 44 illustrate an embodiment for doing so. As the top view indicates, a light source 100 is rotated so that its projection axis is not parallel with the axis of the reflector 102. Light source 100 is displaced from the focus F of the reflector 102, as the side view indicates, and its projection axis is not parallel with the axis of the reflector 102. This causes a de-focalization of the beam.

4. FIG. 45 illustrates still another embodiment in which a module 110 has a reflector 112 having a vertical cross-section that is elliptical, as opposed to the horizontal cross-section being elliptical as discussed above. The reflector 112 is parabolic in the horizontal plane as shown by the plan view. A light source 116 and lens 114 are arranged as shown. FIG. 46 illustrates multiple modules 110 of the type shown in FIG. 45, wherein the vertical cross-section is elliptical. Multiple modules 110 are placed adjacent each other to form a slanted composite structure as shown. Facets F of the type described earlier relative to FIGS. 32A-32D are present in the lens 114.

5. The isolux or light intensity plots are tracings of plots which were produced by the commercially available optics analysis software known as ASAP, available from Breault Research Organization, Inc. of Tucson, Ariz. Some basic principles used by this software are the following.

Figure 47:
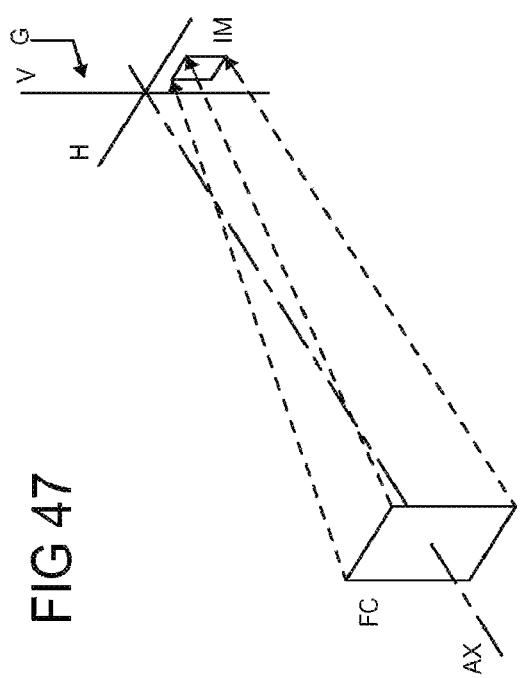

6. In some embodiments, it was mentioned that the reflector could have a plurality of facets, such as facets 44c in FIG. 32C. FIG. 47, left side, illustrates a single facet FC, which is a small reflector, or mirror. It has an axis AX with an imaginary reference grid G aligned with the axis AX some distance away. The grid G contains a horizontal axis H and vertical axis V.

The facet reflects light emitted by a source (not shown), and the reflected light forms an image IM. The position of the image on the grid G will depend on the orientation of the facet FC with respect to the axis AX. It can also depend on the shape of the facet FC, that is, on whether the facet FC is convex, concave or a more complex shape.

Figure 48:
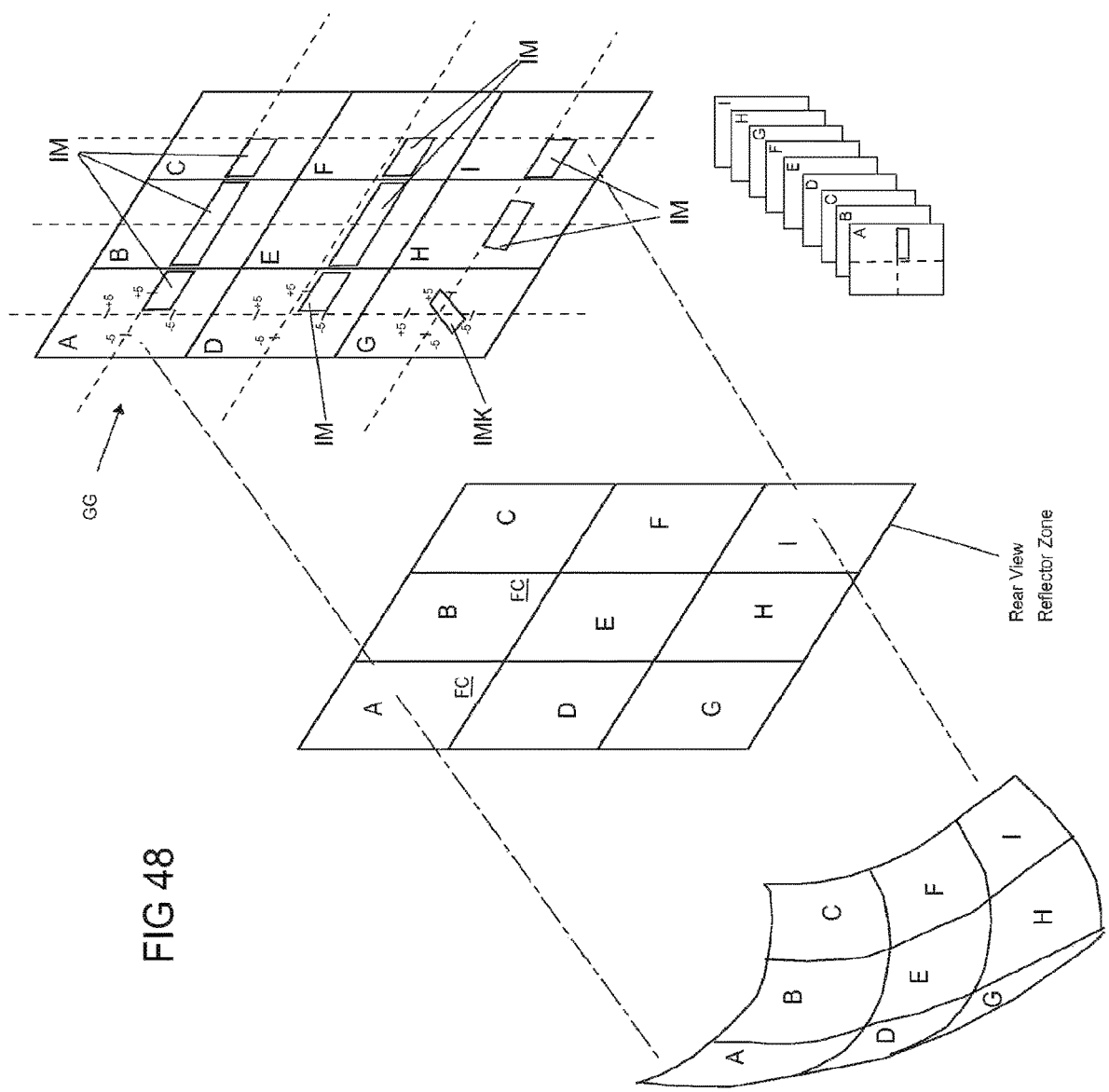

Recall that the reflector, such as reflector 44 shown in FIGS. 32A-3C comprises a plurality of segments, such as segments 44d-44f, and each of these segments 44d-44f comprise a plurality of facets. In this illustration, the segments comprise nine facets. However, it should be appreciated that the reflector R could be divided into more or fewer segments and the segments can have more or fewer facets. FIG. 48, shows nine facets FC, formed into a reflector analogous to the reflector 44 in FIG. 32B. Each facet FC in FIG. 48 forms its own image IM, on a reference grid GG, and some images IM can overlap, as indicated at the lower right region of the combined grids G. The collected images IM form the projected beam or light intensity profile or plot. In the illustration shown in FIG. 48, the beam pattern relates to a low beam pattern with kink, and the image, labeled IMK in FIG. 48 forms at least a portion of the kink described earlier herein. The images IM from all the segments and facets are combined to create the low beam intensity profile. The same is true for the other beam intensity profiles, such as the profiles for the flat beam and the high beam described earlier. In other words, each facet creates an image from the light it receives from the at least one light source and the collective images are composited to create the beam pattern. In FIG. 48 the reference grid GG shows the nine sections A-I, each having an X and Y axis as shown. The grids are shown in a projected view for ease of understanding which image comes from each facet. In reality, the images from each of the facets, A-I, are overlaid on top of each other (as illustrated in the bottom right hand portion of FIG. 48) to generate the beam pattern.

Figure 49:
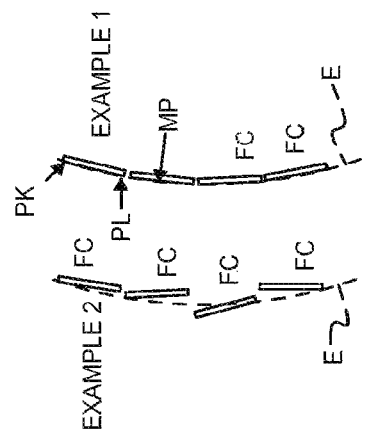
FIGS. 47-49 illustrate an ellipse constructed of individual facets, and how the facets can collectively form a light beam of desired cross-sectional shape.

A significant feature is that the facets FC are positioned and/or dimensioned independently, as opposed to uniformly. For instance, Example 1 in FIG. 49 indicates uniform positioning. The facets are aligned with an ellipse E. Each facet FC has a similar characteristic. For example, one edge of each facet FC can form a chord of the ellipse E. That is, corner points PL and PK of the facet would lie on the ellipse. Thus, one or more facets FC could be parallel to a tangent to the ellipse at the facet's midpoint MP. In Example 1, all facets are uniformly positioned and configured with respect to the ellipse E.

In contrast, in Example 2, each facet FC is positioned and configured independently. The positioning is determined by the desired location of the image IM in the collective grid GG to be produced by the facet FC. Given that independence, the uniformity of Example 1 will be absent. Specifically, in Example 2, all facets will not form chords of the ellipse, although some may do so. Similarly, in Example 2, all facets will not be parallel with tangents located at the midpoint of a facet.

This discussion considered the horizontal cross-sections, which are ellipses. These principles apply to the vertical cross-sections, which can be parabolic. The facets are independently positioned with respect to the parabola. Thus, the facets can comprise different shapes and sizes and will contribute to produce aspects of the beam pattern, such as the kink or elbow mentioned earlier.

A reflector containing such independently positioned and facets can be constructed of an injection molded substrate of plastic resin, and then coated with a reflective coating.

Advantageously, the controlled manipulation of the facets of each reflector permit the resultant beam to have desired characteristics, such as a sharp cut-off or distinct kink (as described earlier herein relative to FIG. 32C).

Figure 50:
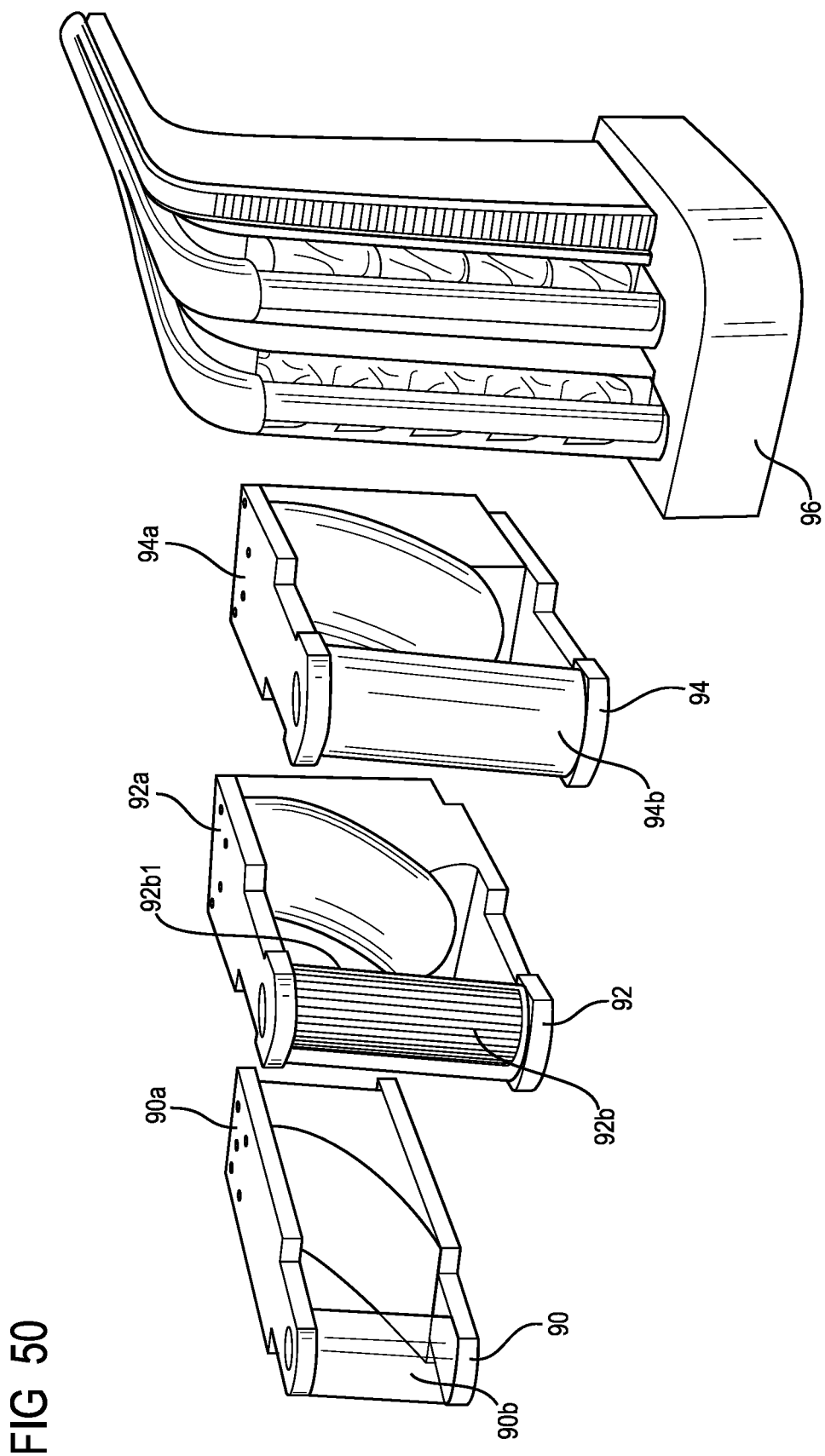
FIG. 50 is a plan view of various modules and assemblies illustrating a headlamp assembly adapted and shaped to a contour of the vehicle.

7. As mentioned earlier herein, one advantageous feature of the embodiment being described is its ability to meet styling demands and provide a lens that complements the contour C of the vehicle V. The features described herein permit a cut-off to be formed exclusively by the reflector, thereby allowing the lens design to be less complex. FIG. 50 illustrates four illustrative designs 90, 92, 94 and 96 showing different shapes and sizes of the headlamp assemblies that may be mounted on the vehicle V which may comprise one or more of the optical modules 10-14 described herein. Note how the assembly can take unique and different elongated shapes and provide a tall thin aspect.

Also, note that the assembly of modules 90-94 each comprise a housing 90a, 92a, 94a that supports the internal components of one or more of the modules 10-14. The lens 90b and 94b of modules 90 and 94, respectively, are smooth on both sides, while an inside surface 92b1 is modulated to provide desired diffusion.

Finally, once mounted on the vehicle V, the lens conforms to the contour C of the vehicle V, thereby providing numerous styling opportunities. Thus, unique styling opportunities are available with the use of a single lens and multiple modules. This is illustrated with the headlamp assembly 96.

A brief summary and other general observations, features and advantages are as follows:

The designs provide a forward lighting automotive module 10 that utilizes a thin aspect (low width) lens for styling. The device can produce a LB module with cutoff (ECE or SAE), or Flat, or HB beam patterns. The optical concept is comprised of a light source, complex reflector (metalized), and a cylindrical type lens (extruded cross-section). In general, the reflector forms a line image at the focus of the lens. The device can be used with other modules with identical front faces for a homogeneous look for styling. Advantages include more simplified molding and manufacture than comparative alternatives, and the designs do not have color dispersion common to many lens solutions.

In one form of the invention, multiple light sources are provided, each associated with (1) a respective reflector of the parabolic/elliptical type, and (2) a projection lens. These modules are stacked in a tall, narrow column, and produce a short, wide light beam to provide a thin aspect low beam. They can also be arranged horizontally. A key point is that their aspect ratio of height/width of the lens to the reflector is greater than or equal to one degree (1.degree.). Multiple lenses could be used for multiple reflectors, respectively, or a single lens may be used with all reflectors.

A converging lens solution is achieved that has advantages for styling and the possibility of additional functionality.

The at least one light source can be any suitable light source, such as a LED light source monochip, a multichip, such as a 1.times.2 multichip or combination thereof.

A faceted, non-imaging reflector can be used to collect source light and direct to a line focus. The design of the reflector forms the cutoff of the beam pattern. The reflector is freeform with facets dedicated to forming an ECE or SAE type cut-off. Also Flat and HB patterns can be formed.

The reflector can be made of standard methods: thermoset+varnish+metallization, or thermoplastic and metallization metal.

A cylindrical concave or cylindrical convex lens can be used with focus at the line focus of the reflector. For a divergent lens, the focus is virtual outside the device and for a converging lens, the focus in inside the device. In general, the lens has an extruded cross-section, made of plastic or glass.

The various cylindrical lenses 18, 32 and 42 have an A-side (visible side) matching the styling intent. The A-side lens surface does not have to be aspherical based on optical considerations.

The device is used in combination with other modules to form a low beam pattern. For example, it may include one kink module and one flat module. Other combinations are possible.

The following features or advantages of various embodiments of the invention may be used alone or in combination:

An optical system that is comprised of reflector and lens. The reflector be generally parabolic in side view, and elliptical in plan view. The reflector can form a line focus before or after the lens. The lens can have extruded imaging cross-section in plan view and be neutral in side view.

An optical system where the reflector controls the cut-off formation without use of a folder and traditional imaging lens.

An optical system that reduces the lens width dimension (thin aspect) versus traditional imaging lenses.

A reflector that uses complex facets to optimize the beam pattern. This allows kinks with steps (ECE kink), sign light to be created.

The use of a rotated light source that improves the formation of kink steps.

An optical system that does not produce color dispersion like a typical imaging system, which is better for an end user and eliminates the need for microstructure to diffuse light.

The shape allows multiple modules to be integrated into a design using one common lens (drawing). The shape of the lens allows the lens to be made taller than a traditional imaging lens without creating a thick molded part.

The shape of the lens allows the at least one light source and reflector parts to be rotated independently from the lens, allowing cut-offs to be aimed while using a fixed lens.

The optical system allows the lens A side to be defined by styling, allowing consistent appearance between different lenses or multiple reflectors behind a single lens. The reflector and lens B side, which is the side opposite the A side, are changed to control the light pattern, as shown in FIG. 50.

A shape of the lens allows the lens to be integrated as an external lens, such as a side in outside environment as shown in FIG. 41F. This allows reduced parts, reduced cost and unique styling.

A lens with extruded cross-section that allows light to be guided or passed through the lens, at a cross direction from the main beam (optical axis as shown in FIG. 42). This could allow the lens to be used for a second function (park, turn, position, or DRL).

An optical system that allows the use of multiple light sources, some light sources in a defocalized location (FIGS. 43 and 44) that allow a shift in beam pattern from LB state to HB state.

Meet styling demands for unique styling with narrow lens elements and tall aspect.

Simplify the lens molding with less complex lens, and more tolerance (versus comparable alternatives).

A lighting system capable of meeting styling desire for a tall, thin aspect lens with a surface defined by styling.

A system cut-off formed exclusively by the reflector, allowing lens design to be less complex.

This invention, including all embodiments shown and described herein, could be used alone or together and/or in combination with one or more of the features or steps mentioned in the Summary of the Invention and covered by the claims, both of which are incorporated herein by reference.

While the system, apparatus and method herein described constitute preferred embodiments of this invention, it is to be understood that the invention is not limited to this precise system, apparatus and method, and that changes may be made therein without departing from the scope of the invention which is defined in the appended claims.

What is claimed is:

1. A lighting device of a vehicle, comprising:
    a primary reflector that is generally parabolic in a first section and generally elliptical in a second section, with the primary reflector used for a primary function;
    a secondary reflector that is used for a secondary function;
    a plurality of light sources, a portion of which are coincident with a focus, some of the plurality of light sources project light to the primary reflector from which a focused line is formed; and
    a lens, with a first end and a second end, that transmits light from the focused line that is configured to form a beam using at least one cut-off for the primary function, with the lens further configured to function as a waveguide from the first end to the second end for the secondary function;
    wherein others of the plurality of light sources project light into the first end to propagate light through the lens, with the propagated light existing the second end to project light onto the secondary reflector for the secondary function.

2. The lighting device according to claim 1, wherein the lens is tilted off a vertical plane toward the primary reflector by 20 degrees or less.

3. The lighting device according to claim 1, wherein the lens comprises a side that forms part of an external surface of the vehicle.

4. The lighting device according to claim 1, wherein the focused line is between the primary reflector and the lens.

5. The lighting device according to claim 1, wherein the focused line is outside the lens.

6. The lighting device according to claim 1, wherein the some of the plurality of light sources are rotated relative to at least one focus of the reflector in at least one of a vertical plane or a horizontal plane.

7. The lighting device according to claim 1, wherein the lens is an elongated lens that has a neutral power along a length of the elongated lens.

8. The lighting device according to claim 7, wherein the elongated lens is not parallel with the focused line.

9. The lighting device according to claim 1, wherein the primary reflector includes a plurality of segments or facets.

10. The lighting device according to claim 9, wherein at least one of said plurality of segments or facets is aimed or deviated from an optical axis of the primary reflector or is defocused.

11. The lighting device according to claim 1, wherein the primary function can be one of a flat beam pattern, a high beam pattern, a beam pattern having a kink or elbow, or a low beam pattern and the secondary function can be one of park, turn, position, or DRL.

12. The lighting device according to claim 1, wherein the lens is inclined relative to the primary reflector.

13. The lighting device according to claim 1, wherein a projection axis of the some of the plurality of light sources is deviated from the optical axis of the primary reflector by 5 to 15 degrees.

14. The lighting device according to claim 1, wherein:
    the primary reflector has a plurality of reflective facets, each positioned along a geometric surface of the primary reflector, such that fewer than all surface normals of the plurality of reflective facets are aligned with surface normals of the geometric surface at the respective locations of the plurality of reflective facets;
    the some of the plurality of light sources project light to the plurality of reflective facets; and
    the plurality of reflective facets collectively have an optical axis and the some of the plurality of light sources has projection axis which deviates from the optical axis horizontally by 5 to 20 degrees.

15. The lighting device according to claim 1, wherein the primary reflector has a plurality of facets, at least one of which is configured and dimensioned to generate a predetermined light beam characteristic; and wherein the light beam characteristic is at least one of a flat beam pattern, a high beam pattern, a beam pattern having a kink or elbow or a low beam pattern that conforms to Society of Automotive Engineers (SAE) or Economic Commission Europe (ECE) beam pattern requirements.

16. The lighting device according to claim 1, wherein the lens has a length in comparison to a length of the primary reflector of a ratio, a lens length to reflector length ratio, greater than or equal to 1.

17. The lighting device according to claim 1, wherein the plurality of light sources include a number of light emitting diodes (LED) or solid state lights.

18. The lighting device according to claim 1, wherein the primary reflector has a width in comparison to a width of the lens of a ratio, a reflector width to lens width ratio, greater than or equal to 1.

19. The lighting device according to claim 1, wherein the lens has a thin aspect ratio and is generally narrow along its length.

20. The lighting device according to claim 1, wherein the lens is closer to the focused line at one end than as compared with the other end.

* * * * *